(12) United States Patent
Nevins

(10) Patent No.: US 8,350,482 B2
(45) Date of Patent: Jan. 8, 2013

(54) HYBRID LIGHTING DEVICE

(76) Inventor: Michael Olen Nevins, Jackson, MI (US)

( * ) Notice: Subject to any disclaimer, the term of this patent is extended or adjusted under 35 U.S.C. 154(b) by 0 days.

(21) Appl. No.: 13/351,620

(22) Filed: Jan. 17, 2012

(65) Prior Publication Data

US 2012/0176777 A1 Jul. 12, 2012

Related U.S. Application Data

(63) Continuation of application No. 12/248,693, filed on Oct. 9, 2008, now Pat. No. 8,106,593.

(51) Int. Cl.
*H05B 37/00* (2006.01)
(52) U.S. Cl. .......................... 315/149; 315/159; 362/183
(58) Field of Classification Search .................. 315/149, 315/158, 156, 157, 159; 362/183, 192, 193
See application file for complete search history.

(56) References Cited

U.S. PATENT DOCUMENTS

| | | | |
|---|---|---|---|
| 6,316,883 B1 | 11/2001 | Cho et al. | |
| 2008/0037243 A1 | 2/2008 | Discoe et al. | |
| 2008/0232094 A1* | 9/2008 | Ramsdell | 362/153 |
| 2009/0278674 A1 | 11/2009 | Gross et al. | |
| 2010/0220466 A1 | 9/2010 | Pelken et al. | |

FOREIGN PATENT DOCUMENTS

| | | |
|---|---|---|
| KR | 20-0209969 Y1 | 1/2001 |
| KR | 20-0373968 Y1 | 1/2005 |
| KR | 10-0609481 A | 8/2006 |
| KR | 10-0672841 A | 1/2007 |
| WO | 02/33311 A1 | 4/2002 |

OTHER PUBLICATIONS

International Search Report of Application No. PCT/US2008/082939 mailed May 25, 2009.
Shin, Streetlight and Power Control Device Thereof Using the Light of the Sun/Wind Velocity, Jan. 24, 2007, translation.

* cited by examiner

*Primary Examiner* — David H Vu
(74) *Attorney, Agent, or Firm* — Lowe, Hauptman, Ham & Berner, LLP

(57) ABSTRACT

A hybrid lighting device is described. The hybrid lighting device comprises a solar panel arranged to generate electric power; a wind turbine arranged to generate electric power; an energy storage device electrically connected with the power controller and arranged to store electric power; a power controller electrically connected with the energy storage device and the solar panel and the wind turbine and arranged to transfer electric power; and an induction-based light source electrically connected with the power controller.

20 Claims, 27 Drawing Sheets

HYBRID LIGHTING DEVICE

BACKGROUND

Numerous approaches to providing illumination in darkened areas have been attempted. Typically, an electric current is provided to a lamp to cause a light bulb installed in the lamp to generate illumination, e.g., via a glowing filament, to a surrounding area. Other approaches have used a burning gas or other material to generate illumination to a surrounding area.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
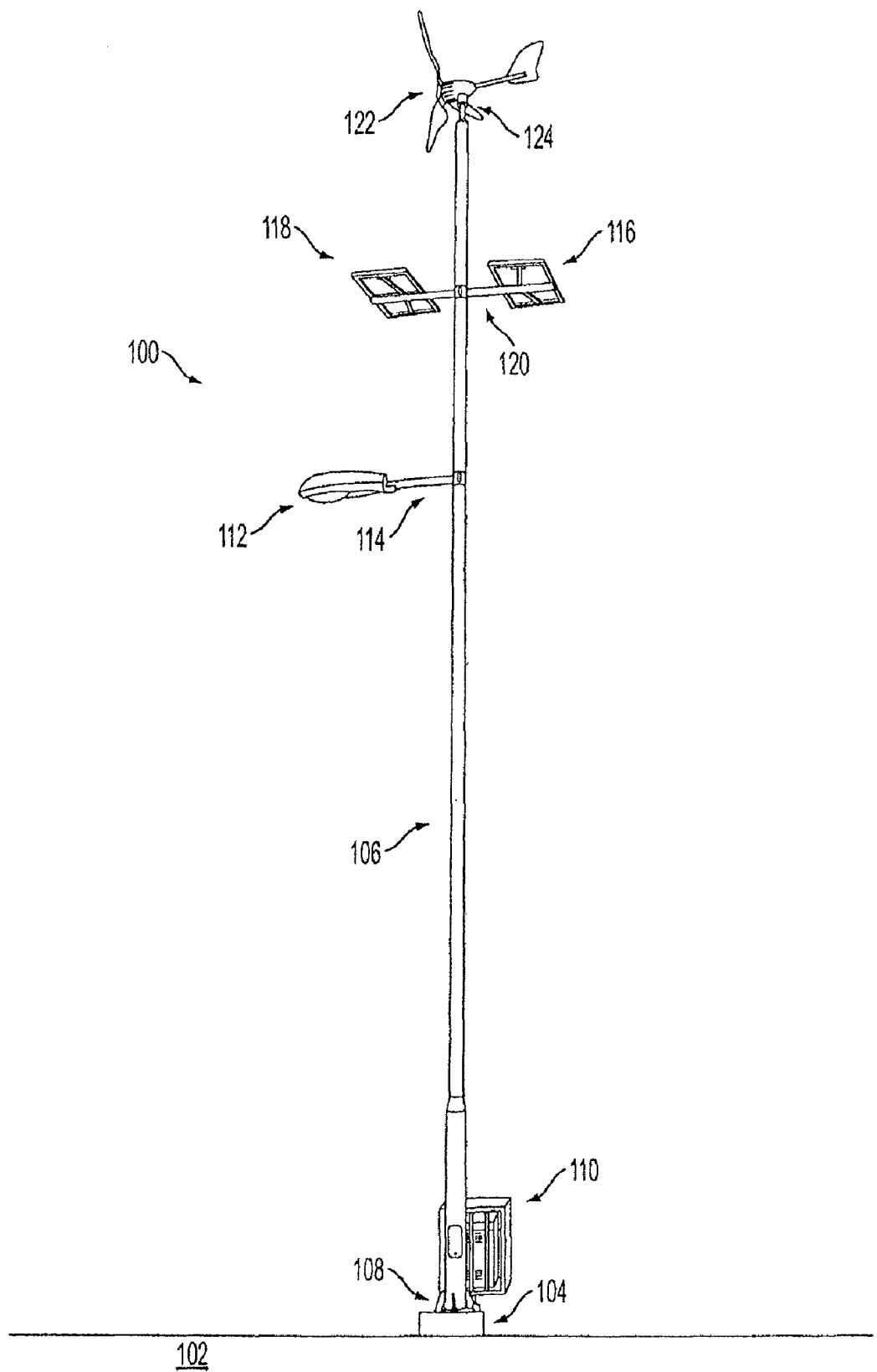
FIG. 1 is a view of an embodiment of a hybrid lighting device.

FIG. 1 depicts a perspective view of a hybrid lighting device 100 according to an embodiment of the present invention. Hybrid lighting device 100 is installed on a surface 102 by way of a pedestal 104. In at least some embodiments, surface 102 comprises ground, roadway, or other supporting surface. In at least some embodiments, pedestal 104 comprises any of a number of supportive materials such as stone, concrete, metal, etc.

Hybrid lighting device 100 comprises a vertically extending support pole 106. In at least some embodiments, support pole 106 is hollow; however, in other embodiments different configurations may be possible. In at least some embodiments, support pole 106 may be comprised of metal, plastic, concrete and/or a composite material. Support pole 106 connects to pedestal 104 at a pole base 108 of the support pole. In at least some embodiments, pole base 108 is formed as an integral part of support pole 106. In at least some embodiments, a plurality of mounting bolts may be used to secure pole base 108 to pedestal 104.

An energy storage device 110, e.g., a battery, is located adjacent pole base 108 and electrically coupled to one or more devices connected to support pole 106. In at least some embodiments, energy storage device 110 may comprise a plurality of batteries. In at least some embodiments, energy storage device 110 may be formed as an integral part of support pole 106.

Hybrid lighting device 100 also comprises a light source 112 physically connected to support pole 106 by a light source connecting rod 114. In at least some embodiments, light source connecting rod 114 is made of the same material as support pole 106. In at least some embodiments, connecting rod 114 may be of a different shape and/or configuration. Light source 112 comprises an induction-based light source for providing illumination to an area adjacent support pole 106.

In at least some embodiments, light source 112 is an induction-based light source in order to provide increased lifespan and/or reduce a required initial energy requirement for illumination. An induction-based light source does not use electrical connections through a lamp in order to transfer power to the lamp. Electrode-less lamps transfer power by means of electromagnetic fields in order to generate light. In an induction-based light source, an electric frequency generated from an electronic ballast is used to transfer electric power to an antenna coil within the lamp. In accordance with at least some embodiments, light source 112 may have an increased lifespan with respect to other types, e.g., incandescent and/or florescent light sources having electrodes. In accordance with at least some embodiments, light source 112 may have a reduced initial energy requirement for start up of the light source.

In at least some embodiments, induction-based light source 112 is a 70 Watt induction lamp or a 100 Watt induction lamp. An advantage of using an induction lamp is enabling use of a smaller system due to high luminous flux and luminous intensity of the luminaries. In at least some embodiments, the use of high scotopic values of the induction system of the induction lamp enables a significant reduction in the size of wind turbine 122 and/or solar panels 116, 118. Induction technology is a fluorescent lamp without electrodes. In accordance with induction lamp technology, the lamp relies on magnetic induction to ignite the phosphors rather than electrodes (electrodes are the components which burn out in a linear lamp resulting in frequent replacement). Since induction-based lamps do not have components which can burn out the induction lamps are rated at 100,000 hours, lasting longer than 100 incandescent, 5 HID, or 5 typical fluorescent lamp changes.

In at least some embodiments, light source 112 is electrically connected, either directly or indirectly, to energy storage device 110. In at least some alternate embodiments, hybrid lighting device 100 may comprise more than one light source. In at least some embodiments, light source 112 may be arranged to provide illumination in a directional manner, i.e., downward, upward, etc., with respect to an orientation of the light source. In at least some embodiments, hybrid lighting device 100 may comprise a plurality of light sources arranged at differing elevations and/or at different angular spacing about support pole 106. In at least some embodiments, light source 112 is directly attached to support pole 106 without use of a connecting rod.

In at least some embodiments, induction-based light source 112 comprises a light sensor arranged to trigger activation of the induction-based light source based on a detected light level. In at least some embodiments, the detected light level is determined with respect to a particular area proximate support pole 106.

Hybrid lighting device 100 also comprises a pair of solar panels 116, 118 physically connected to support pole 106 by a solar panel connecting rod 120. Solar panels 116, 118 generate an electric charge in response to receipt of solar radiation. In at least some embodiments, solar panel connecting rod 120 is made of the same material as support pole 106. In at least some embodiments, connecting rod 120 may be of a different shape and/or configuration. In at least some embodiments, a single solar panel may be used in place of a pair of solar panels. In at least some embodiments, support pole 106 comprises more than one solar panel with each solar panel arranged at a different elevation along the vertical length of the support pole. In at least some embodiments, solar panels 116, 118 may be directly attached to support pole 106 without use of a connecting rod.

In at least some embodiments, solar panels 116, 118 are electrically connected, either directly or indirectly, to energy storage device 110. In at least some alternate embodiments, hybrid lighting device 100 may comprise more than one pair of solar panels or an odd number of solar panels. In at least some embodiments, solar panels 116, 118 may be arranged to receive solar radiation at an optimal angle with respect to the sun. In at least some embodiments, solar panels 116, 118 may be positionable with respect to receiving solar radiation. In at least some further embodiments, solar panels 116, 118 may be attached to support pole 106 by use of a solar tracking apparatus arranged to maintain a position of the solar panels with respect to the sun during the course of a day.

In at least some embodiments, solar panels 116, 118 each are able to generate 50 Watts of power. In at least some other embodiments, solar panels 116, 118 each are able to generate greater than 50 Watts of power, e.g., 100 Watts or more.

Hybrid lighting device 100 also comprises a wind turbine 122 physically connected to and positioned atop support pole 106 via a mounting point 124. Wind turbine 122 generates an electric charge in response to rotation of the turbine blades as a result of the impact of wind, i.e., air flow, on the blades. In at least some embodiments, mounting point 124 is made of the same material as support pole 106. Mounting point 124 enables rotation of wind turbine 122 about support pole 106 such that blades of the turbine receive wind flow to generate electricity. In at least some embodiments, mounting point 124 may be of a different shape and/or configuration.

In at least some embodiments, more than one wind turbine may be attached to support pole 106 and electrically connected with energy storage device 110. In at least some embodiments, wind turbine 122 may be attached to support pole 106 without use of mounting point 124. Wind turbine 122 is electrically connected, either directly or indirectly, to energy storage device 110.

In at least some embodiments, wind turbine 122 may be oriented in a horizontal, vertical, or at an angle with respect to support pole 106. In at least some other embodiments, wind turbine 122 may be integrated within or partially within hybrid lighting device 100.

Figure 2:
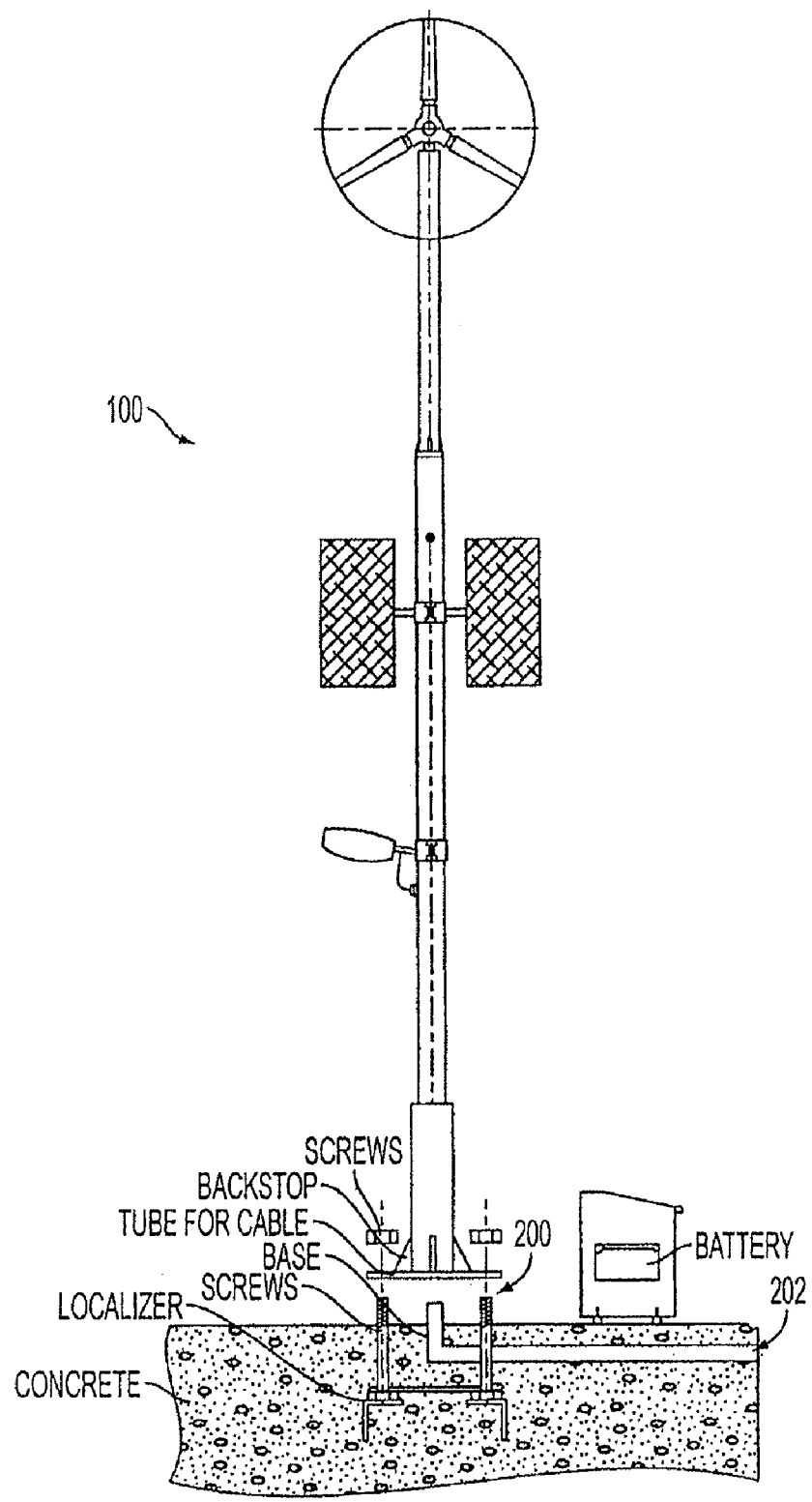
FIG. 2 is a view of an embodiment of a hybrid lighting device according to an embodiment.

FIG. 2 depicts a plan view of hybrid lighting device 100 according to an embodiment. As depicted, support pole 106 is connected via threaded bolts 200 protruding through base support 108. Threaded bolts 200 are set into concrete pedestal 104 which also supports energy storage device 110. Pedestal 104 comprises a tube 202 for joining electric wires from devices on support pole 106 to energy storage device 110.

Figure 3:
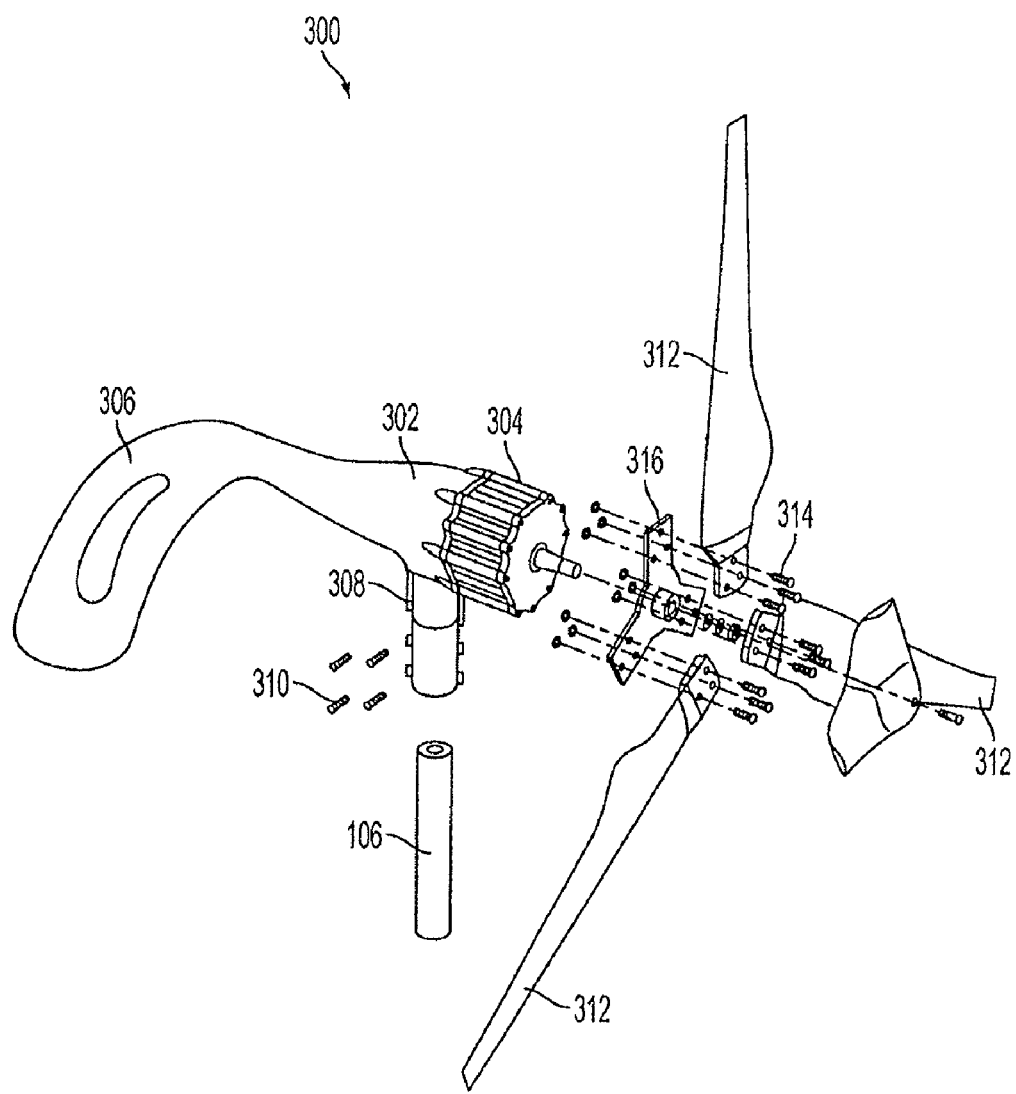
FIG. 3 is an exploded parts detail diagram of a wind turbine useable in conjunction with an embodiment.

FIG. 3 depicts a wind turbine 300 useable in conjunction with a hybrid lighting device 100 according to an embodiment. Wind turbine 122 (FIG. 1) is similar to wind turbine 300.

Wind turbine 300 comprises a main portion 302 comprising a generator 304, a tail section 306, and a connecting flange 308. Tail section 306 adjusts the direction in which wind turbine 300 is pointed responsive to an air flow along the tail section. Connecting flange 308 is the connection point for wind turbine 300 to connect with support pole 106 (FIG. 1). A set of bolts 310 secure wind turbine 300 connected with support pole 106.

Wind turbine 300 also comprises a set of blades 312 arrayed extending from a central drive of generator 304. Generator 304 is rotated and generates electricity in response to rotation of blades 312 responsive to air flow impacting the blade surface. Generator 304 is electrically connected, either directly or indirectly, to energy storage device 110. A set of bolts 314 in combination with a blade flange 316 connect blades 312 to generator 304.

Figure 4:
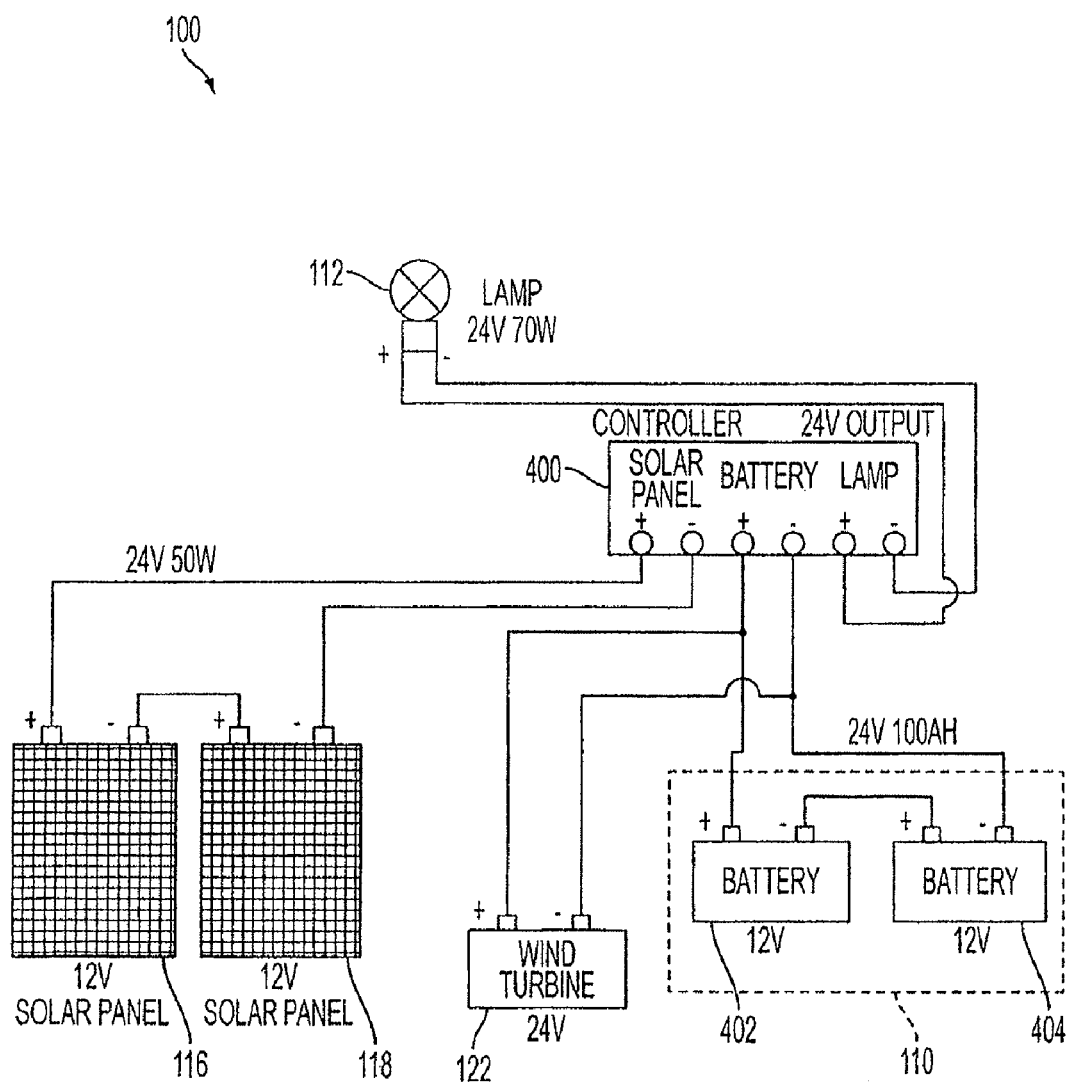
FIG. 4 is a high-level schematic diagram of a hybrid lighting device according to an embodiment.

FIG. 4 depicts a high-level schematic connection diagram of hybrid lighting device 100 according to an embodiment. Light source 112 is electrically connected with a controller 400 via a pair of electrical connections, i.e., wires. Controller 400 is also electrically connected with the pair of solar panels 116 (connected in series), 118, wind turbine 122, and energy storage device 110, each via a pair of electrical connections. As depicted energy storage device 110 comprises a pair of batteries 402, 404 connected in series with controller 400.

As depicted, wind turbine 122 is connected in parallel with energy storage device 110. In at least some embodiments, different electrical connections between the solar panels, wind turbine, energy storage device, light source, and controller may be used without departing from the scope and/or spirit of embodiments of the present invention.

Controller 400 comprises circuitry for controlling the energizing of light source 112 using either or both of electricity from solar panels 116, 118, wind turbine 122, and/or energy storage device 110.

Figure 5:
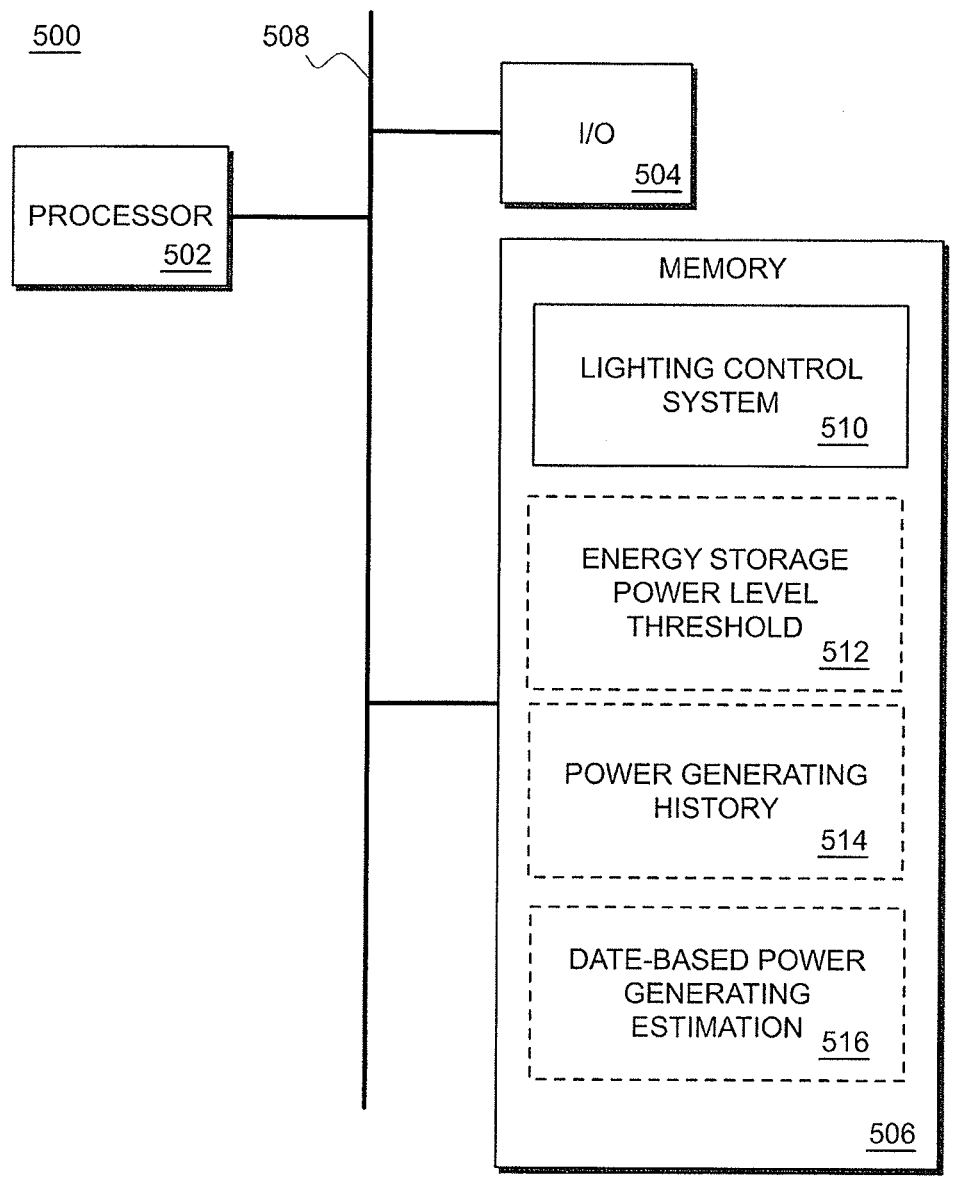
FIG. 5 is a high-level block diagram of a controller according to an embodiment.

FIG. 5 depicts a high-level functional block diagram of a controller 500 usable in conjunction with an embodiment, e.g., as controller 400. Controller 500 comprises a processor or controller-based device 502, an input/output (I/O) device 50, and a memory 506 each communicatively coupled with a bus 508. Memory 506 (which may also be referred to as a computer-readable medium) is coupled to bus 508 for storing data and information and instructions to be executed by processor 502. Memory 506 also may be used for storing temporary variables or other intermediate information during execution of instructions to be executed by processor 502. Memory 506 may also comprise a read only memory (ROM) or other static storage device coupled to bus 508 for storing static information and instructions for processor 502. Memory 506 may comprise static and/or dynamic devices for storage, e.g., optical, magnetic, and/or electronic media and/or a combination thereof.

I/O device 504 may comprise a display, such as a cathode ray tube (CRT) or a flat panel display, for displaying information, alphanumeric and/or function keys for communicating information and command selections to the processor 502, a cursor control device, such as a mouse, a trackball, or cursor direction keys for communicating direction information and command selections to the processor and for controlling cursor movement on the display, or a combination thereof. This input device typically has two degrees of freedom in two axes, a first axis (e.g., x) and a second axis (e.g., y) allowing the device to specify positions in a plane.

Memory 506 comprises a lighting control system 510 according to one or more embodiments for determining illumination of induction-based light source 112 (FIG. 1). In at least some embodiments, lighting control system 510 determines how long light source 112 should be illuminated based on a monitored power level of energy storage device 110, monitored power generating patterns with respect to one or both of solar panels 116, 118 and wind turbine 122, and/or a date-based information, or a combination thereof.

In at least one embodiment, lighting control system 510 determines how long light source 112 should be illuminated based on comparing the energy potential stored in energy storage device 110 with an energy storage power level threshold 512 stored in memory 506. In at least some embodiments, energy storage power level threshold 512 comprises a set of values corresponding to different durations in which light source 112 may be illuminated. For example, at a first threshold level, controller 400 may cause light source 112 to illuminate for 4 hours, at a second lower threshold level, the controller may cause the light source to illuminate for 2 hours, etc. In at least some embodiments, energy storage power level threshold 512 comprises a single value above which the energy storage power level must exceed in order for controller 400 to cause the light source to illuminate. The energy storage power level threshold 512 may be predetermined and/or user input to controller 400.

In at least one embodiment, lighting control system 510 determines how long light source 112 should be illuminated based on comparing a power generating history 514 stored in memory 506. Power generating history 514 may comprise a single value or a set of values corresponding to a time and/or date based history of the power generated by one or both or each of solar panel 116, 118 and wind turbine 122. For example, lighting control system 510 may apply a multi-day moving average to the power generating history of one or both or each of solar panel 116, 118 and wind turbine 122 in order to determine the power generating potential for subsequent periods and estimate based thereon the amount of power which may be expended to illuminate light source 112 during the current period. In at least one embodiment, lighting control system 510 applies a three (3) day moving average to the power generating history of one or both of solar panels 116, 118 and wind turbine 122.

In at least one embodiment, lighting control system 510 determines how long light source 112 should be illuminated based on a date-based power generating estimation 516 stored in memory 506. For example, depending on a geographic installation location of hybrid lighting device 100 (FIG. 1), controller 400 may determine the illumination of light source 112 based on a projected amount of daylight for the particular location, e.g., longer periods of darkness during winter in Polar locations as opposed to Equatorial locations. In at least some further embodiments, controller 400 may be arranged to cause illumination of light source 112 for a predetermined period of time based on information from one or more of energy storage power level threshold 512, power generating history 514, and/or date-based power generating estimation 516 and after termination of the predetermined period be arranged to cause illumination of the light source responsive to a signal from a motion sensor for a second predetermined period of time.

In at least some further embodiments, lighting control system 510 determines when light source 112 should be illuminated based on receipt of a signal from an occupancy or traffic detector, e.g., a motion sensor operatively coupled with controller 400.

In at least some embodiments, controller 400 also comprises an electrical connection to a mains power supply. The mains power supply connection may be used in a backup/emergency situation if neither of the solar panels 116, 118, wind turbine 122, or energy storage device 110 are able to supply sufficient power levels to power light source 112. In another embodiment, the mains power supply connection may be used to return power generated by hybrid lighting device 100 to a power supply grid. In at least some embodiments, the returned electric power may be returned for free or for a predetermined price.

In at least some embodiments, controller 400 regulates the supply of electricity to light source 112. By regulating the supplied electricity, controller 400 may prevent and/or minimize unexpected spikes or drops in the supplied electricity level to light source 112. In at least some embodiments, controller 400 may also direct from which component light source 112 receives electricity, e.g., energy storage device 110 or directly from wind turbine 122, solar panels 116, 118, etc.

In at least some embodiments, controller 400 also comprises a light sensor to determine if a predetermined threshold has been met in order to transfer electricity to light source 112 to cause the light source to activate and generate illumination. In at least some alternate embodiments, light source 112 comprises the light sensor. The light sensor is a switch controlled by a detected light level, e.g., if the light level is below a predetermined threshold level, the switch is closed and electricity flows to light source 112.

Figure 6:
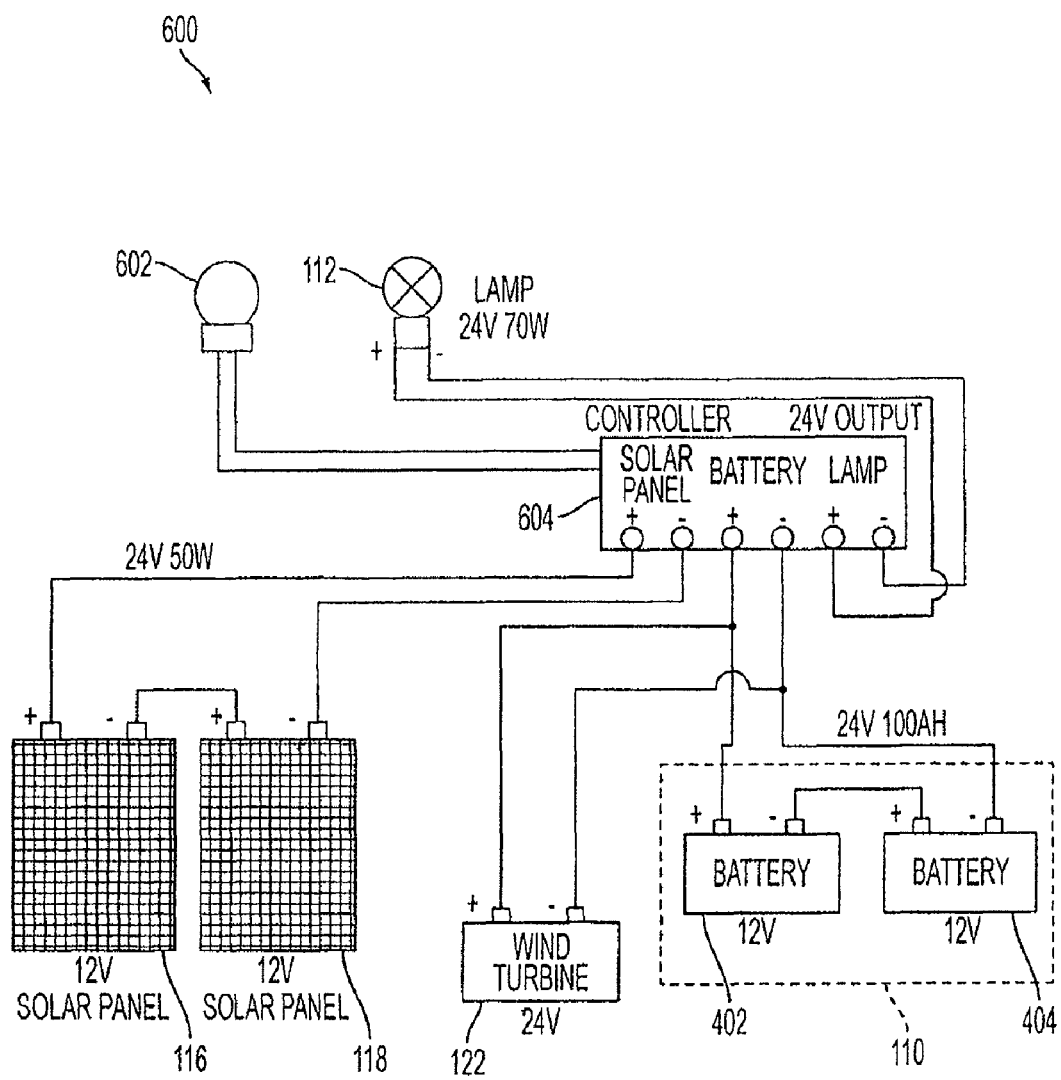
FIG. 6 is a high-level schematic diagram of a hybrid lighting device according to another embodiment.

FIG. 6 depicts a high-level schematic connection diagram of a hybrid lighting device 600 according to another embodiment similar to the FIG. 4 embodiment. Hybrid lighting device 600 differs from hybrid lighting device 100 by comprising an additional non-induction-based light source 602 and a controller 604. In accordance with the FIG. 6 embodiment, controller 604 controls activation of induction-based light source 112 and/or non-induction-based light source 602. In at least some embodiments, controller 604 may selectively enable activation of one or both of light sources 112, 602 depending on one or more lighting parameters, e.g., short startup time, illumination level required, etc. Other elements depicted in FIG. 6 are as described above with reference to FIG. 4.

In at least some embodiments, hybrid lighting device 100 may comprise solely induction-based light sources.

Figures 7, 7A, 7B:
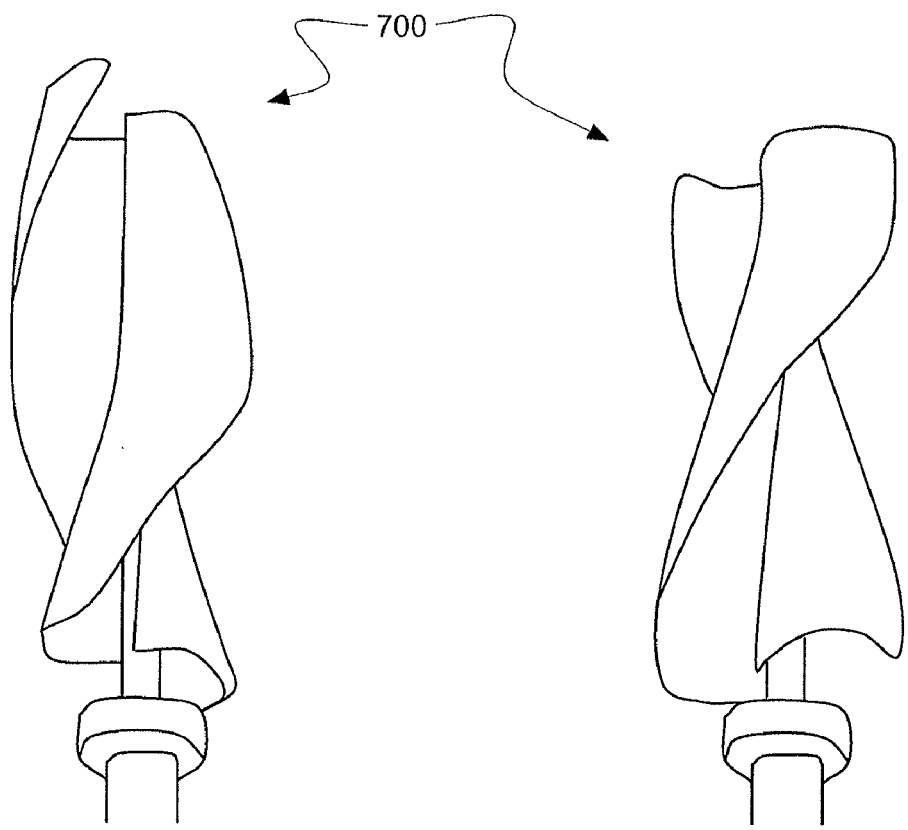
FIG. 7 is two views (FIGS. 7A and 7B) of a vertical wind turbine usable in conjunction with an embodiment.

FIG. 7 depicts two views, comprising FIGS. 7A and 7B, of a vertical wind turbine 700 usable in conjunction with an embodiment. In at least some embodiments, wind turbine 700 may replace wind turbine 122 atop support pole 106. In at least some embodiments, wind turbine 700 is positioned within support pole 122, i.e., retaining sufficient openings in support pole 122 to permit passage of air to move the wind turbine, and in still further embodiments, wind turbine 700 is positioned below light source 112. In at least some embodiments, wind turbine 700 comprises a pair of shaped, twisted rectangular surfaces positioned about a central shaft extending vertically. Other arrangements and configurations are contemplated.

Figure 8:
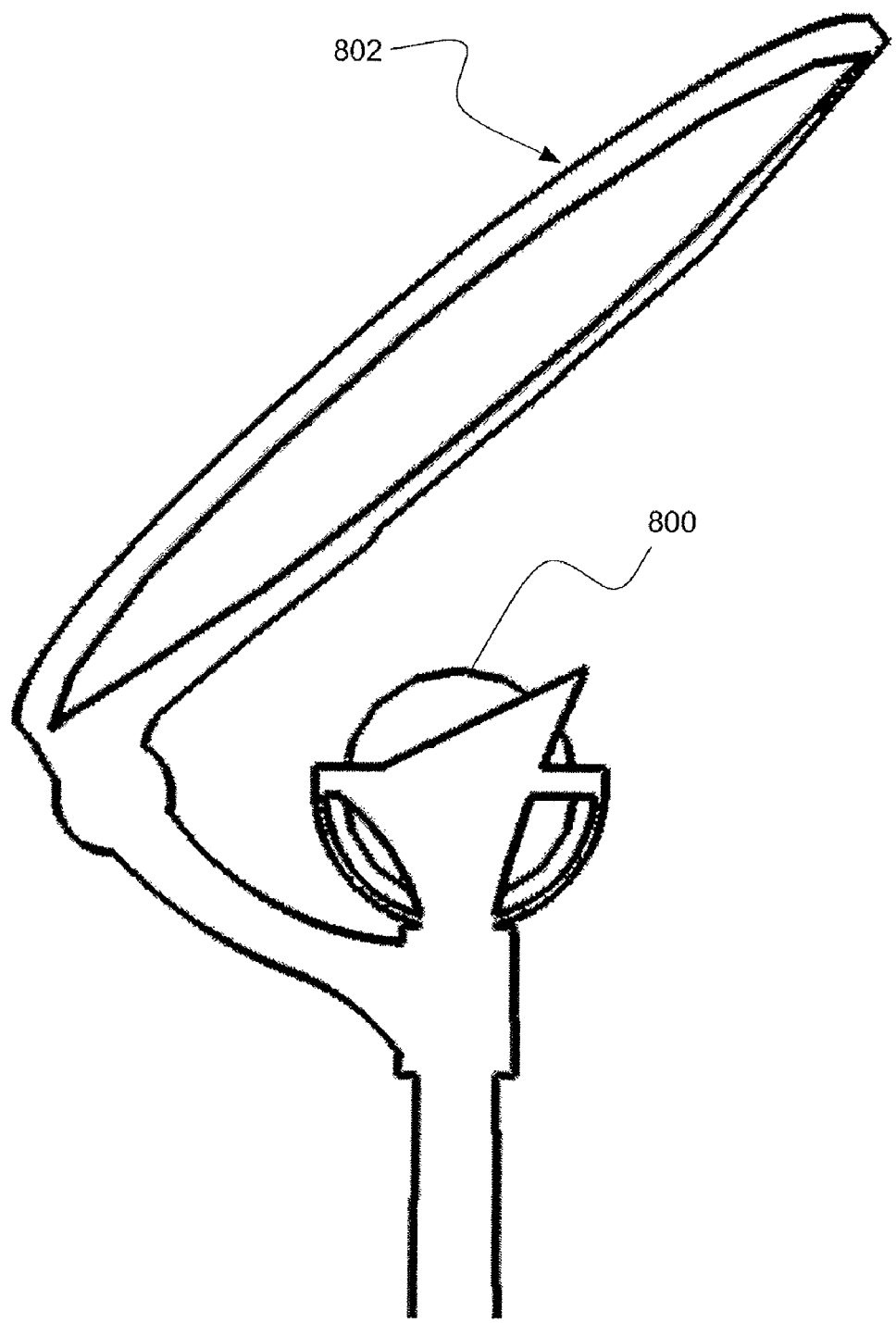
FIGS. 8-25 depict at least a portion of a hybrid lighting device according to one or more embodiments.

FIG. 8 depicts a side view of a combined light source 800 and solar panel 802 usable in conjunction with hybrid lighting device 100 according to an embodiment. Light source 800 and solar panel 802 may replace light source 112 and solar panels 116, 118 and be positioned atop or otherwise affixed to support pole 106. The rear of the surface comprising solar panel 802 may be a smooth, light reflecting surface in at least some embodiments.

Figure 9:
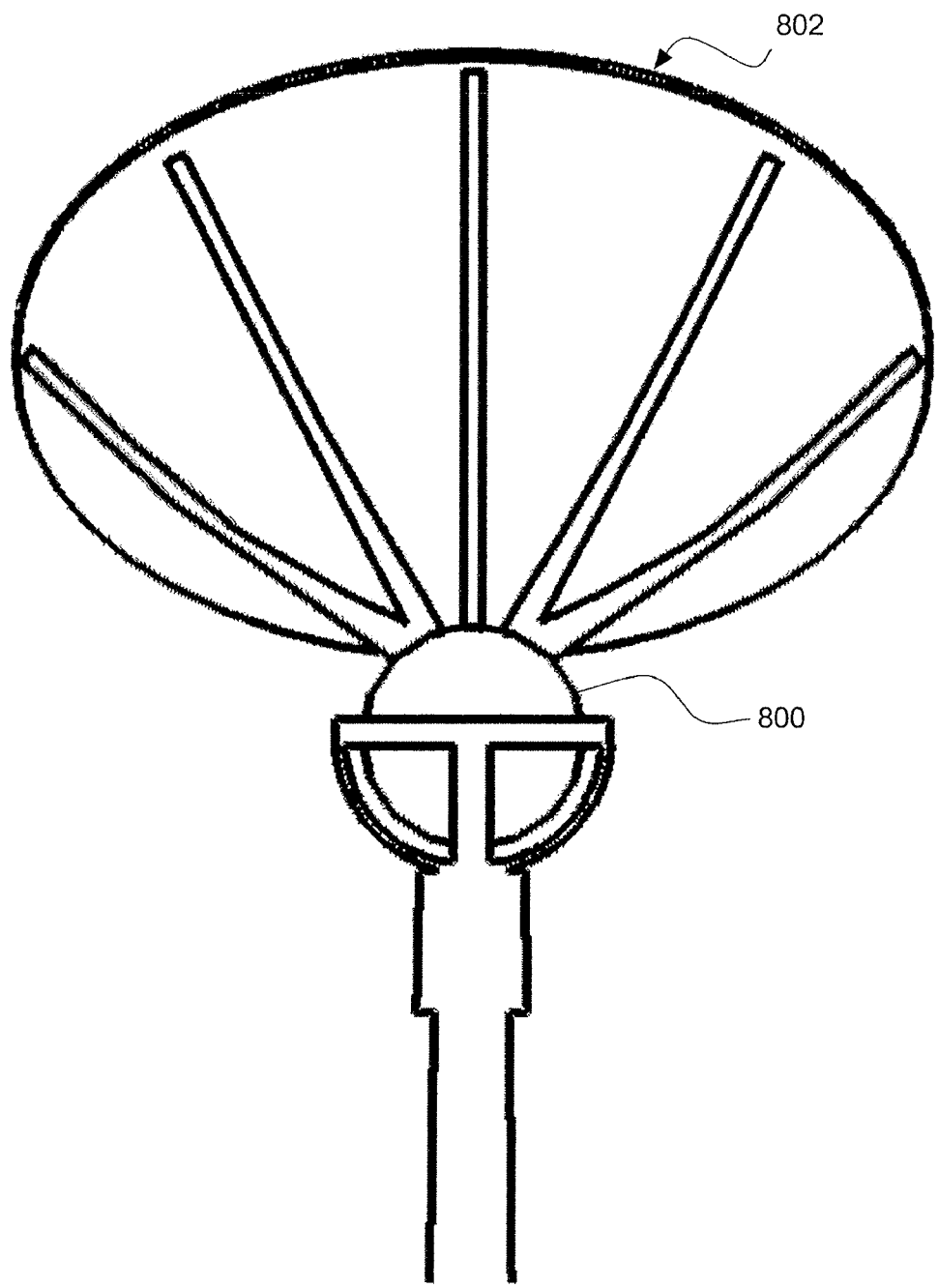
Figure 10:
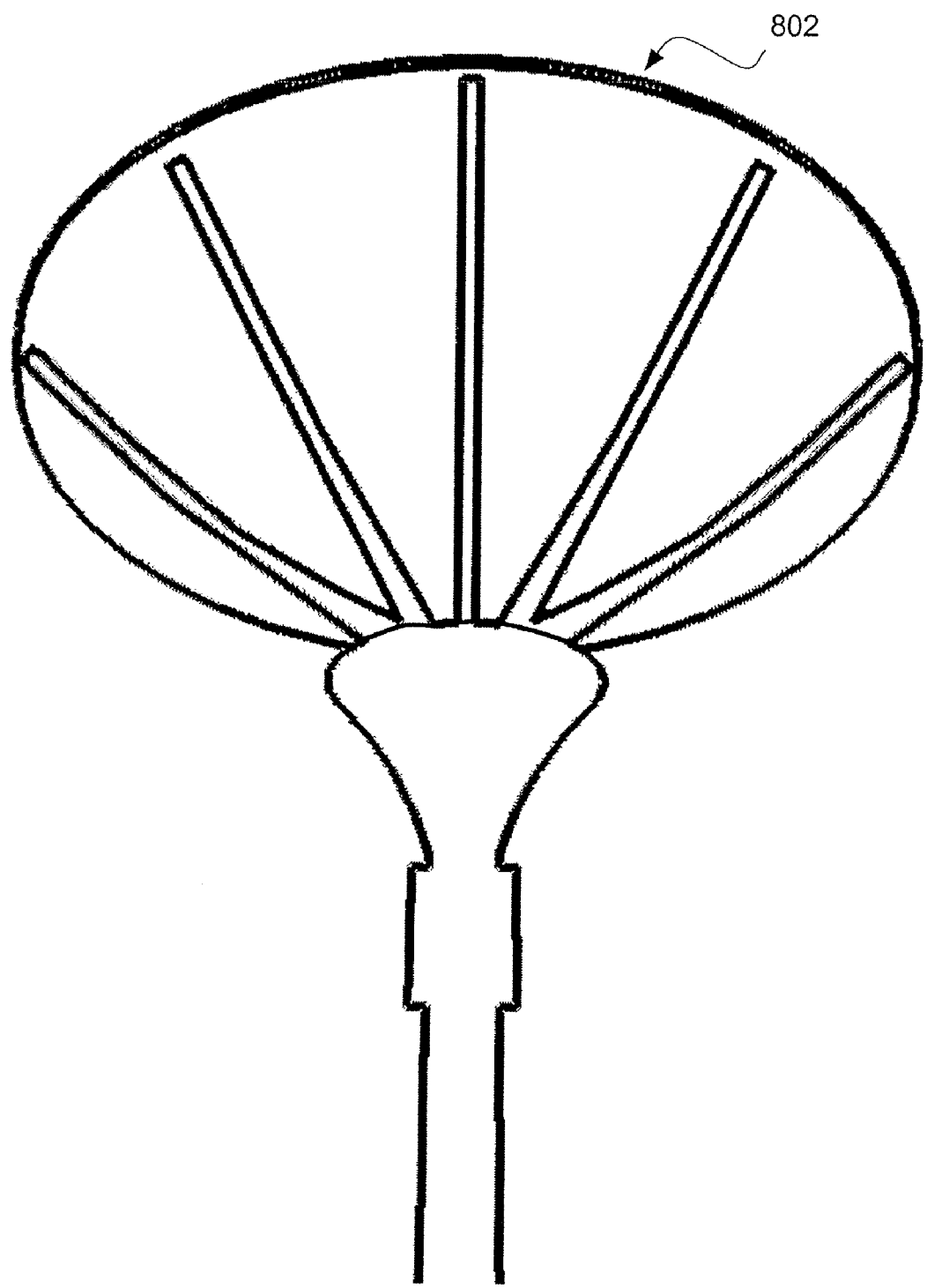

FIG. 9 depicts a rear view of the FIG. 8 embodiment. FIG. 10 depicts a variation on the FIG. 8 embodiment in which the light source 800 is hidden behind a surrounding cover and light generated by the light source is reflected off the rear of the solar panel surface. In at least some embodiments, light source 800 is removed from the FIG. 10 embodiment.

Figure 11:
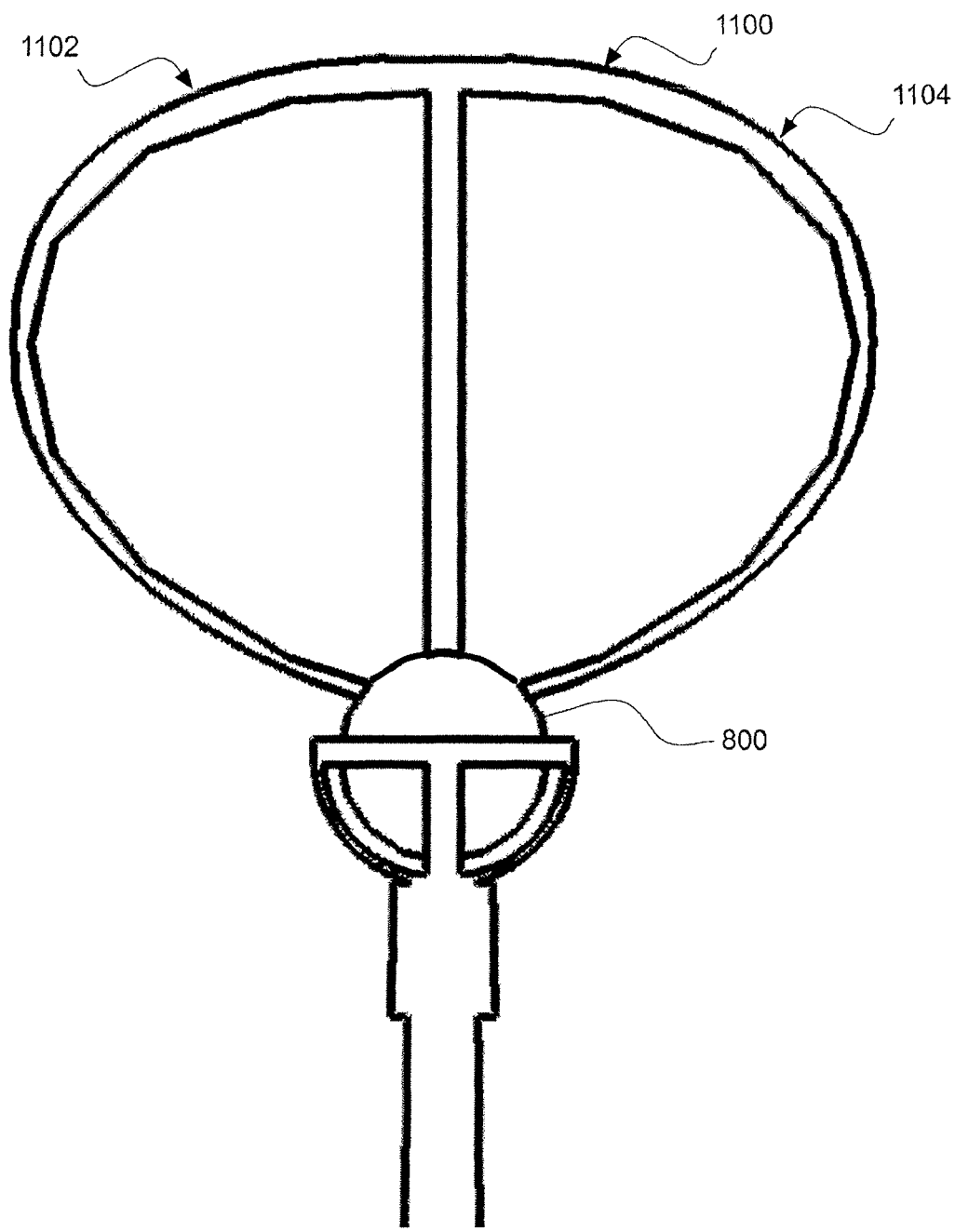
Figure 12:
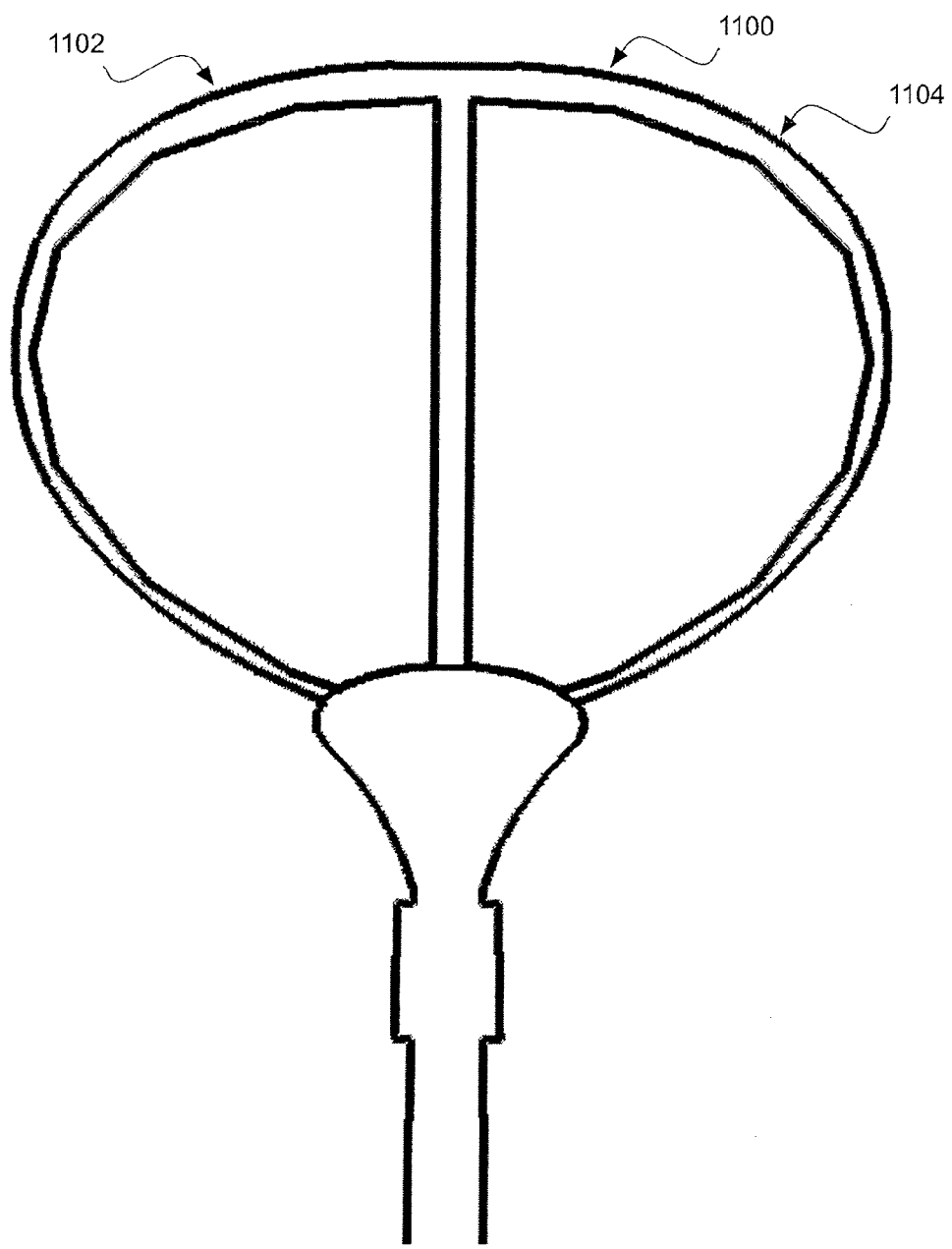
Figure 13:
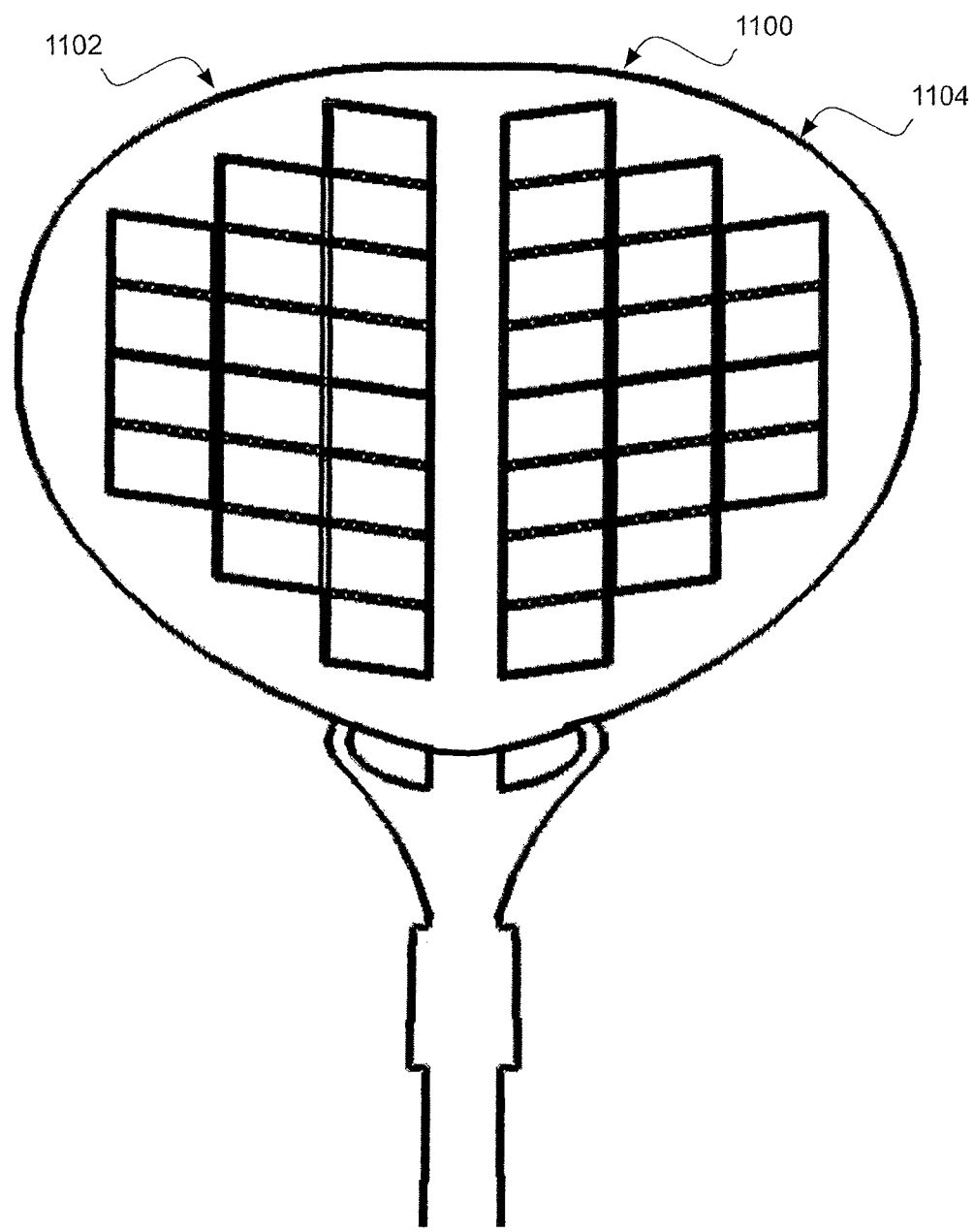
Figure 14:
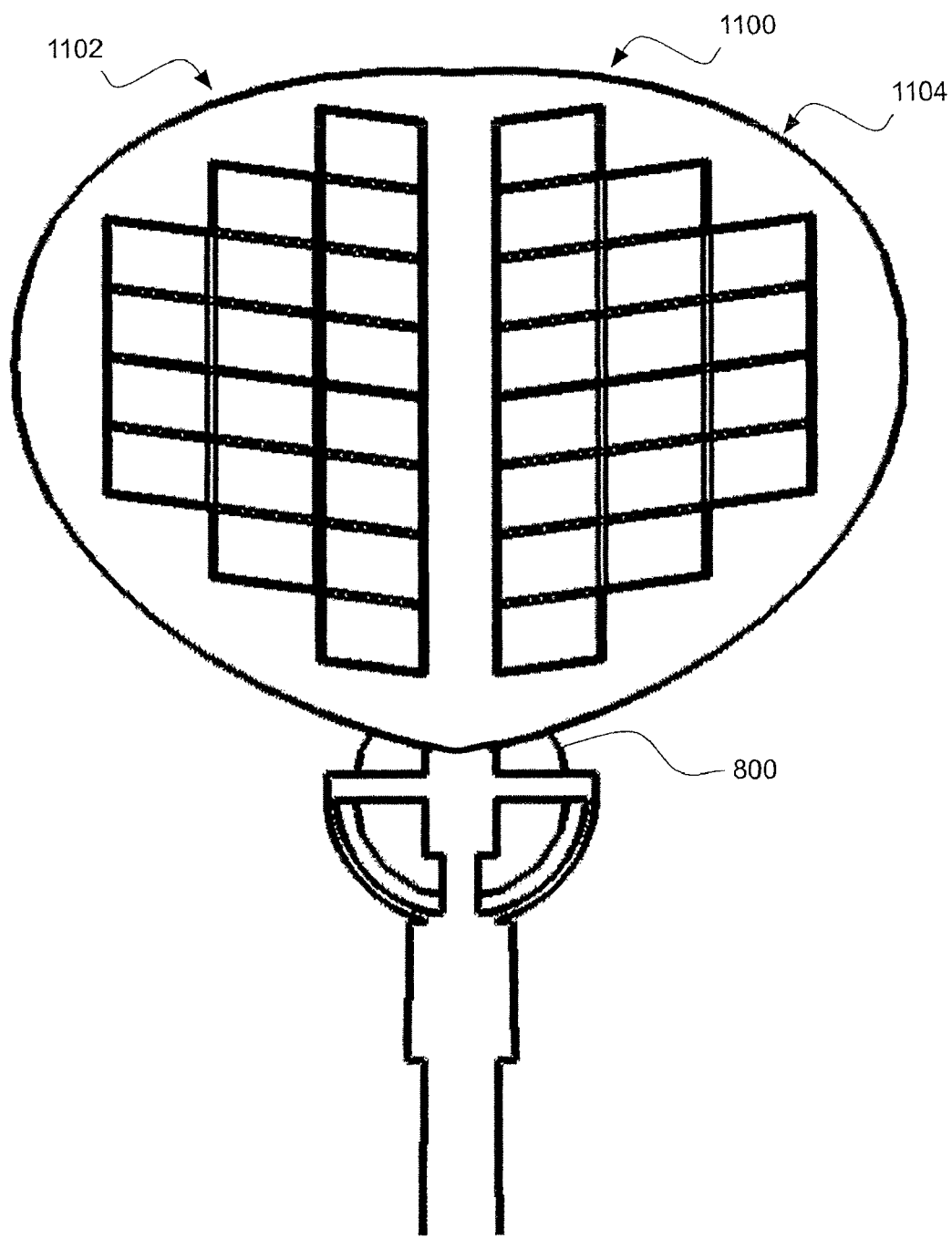
Figure 15:
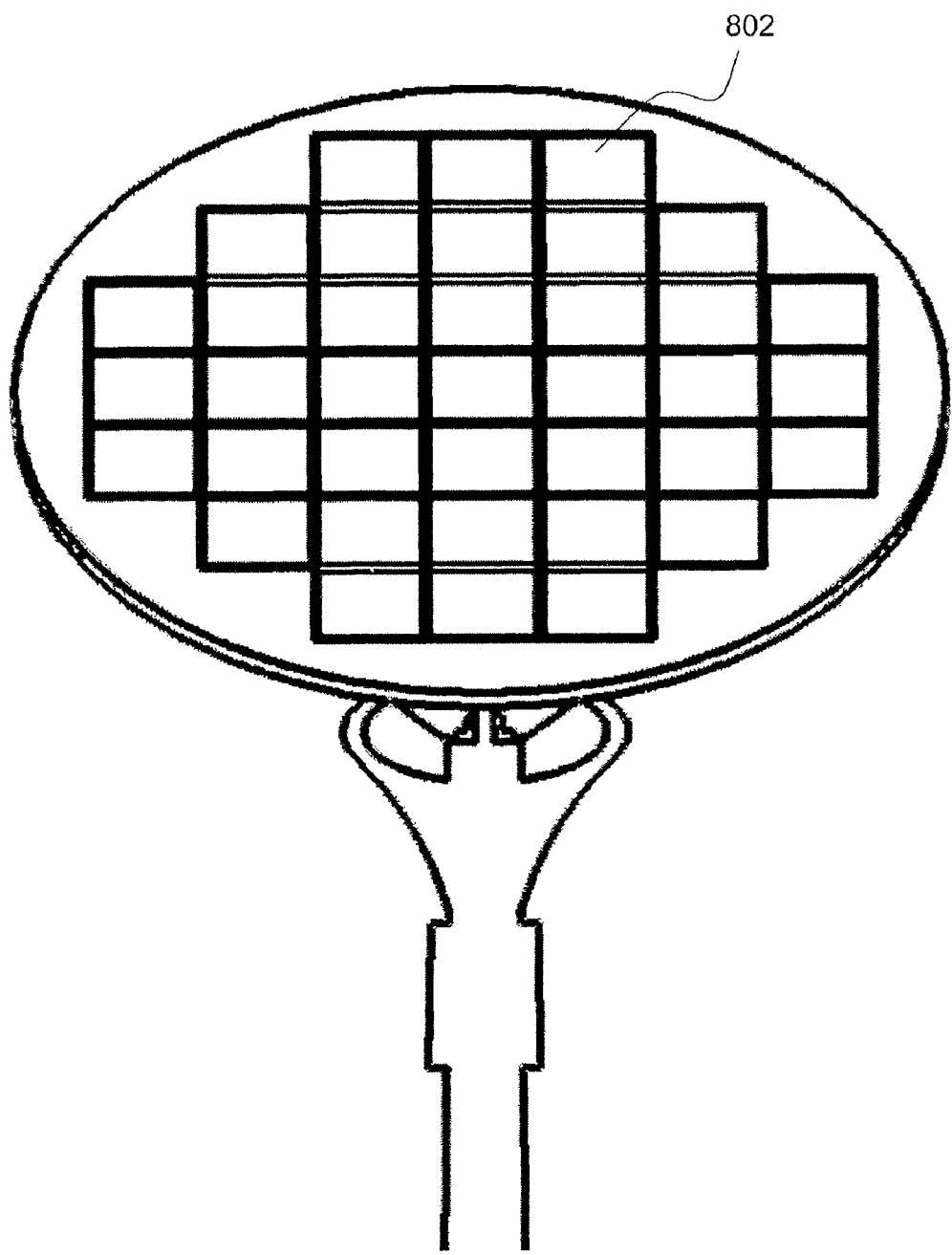

FIG. 11 depicts a rear view of another variation on the FIG. 8 embodiment in which a solar panel 1100 comprises a split pair of panels 1102, 1104 on the surface. FIG. 12 depicts a rear view of a variation on the FIG. 10 embodiment using the split solar panels of FIG. 11. FIG. 13 depicts a front view of the FIG. 12 embodiment. FIG. 14 depicts another front view of the FIG. 11 embodiment. FIG. 15 depicts a front view of the FIG. 10 embodiment.

Figure 16:
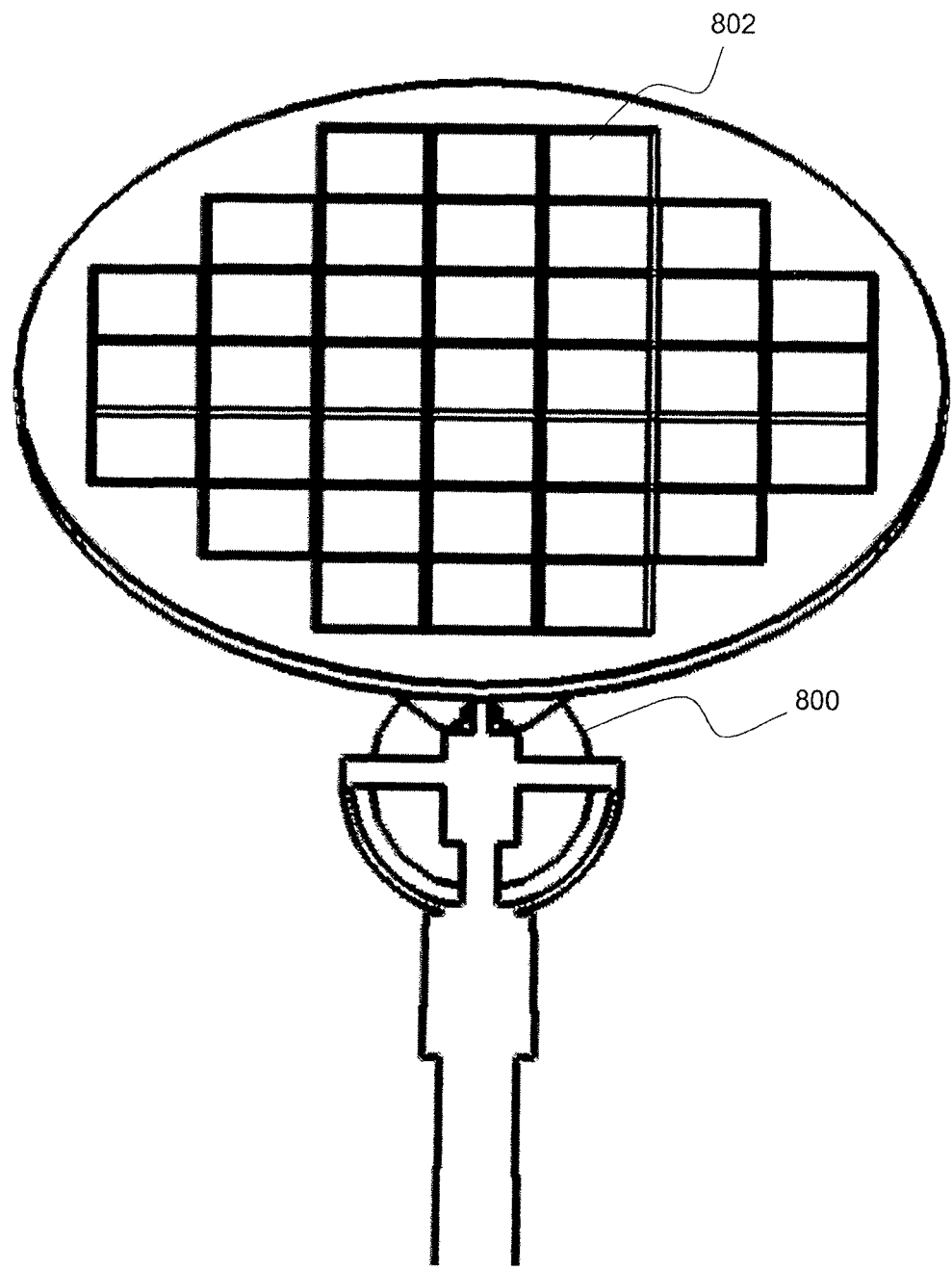
Figure 17:
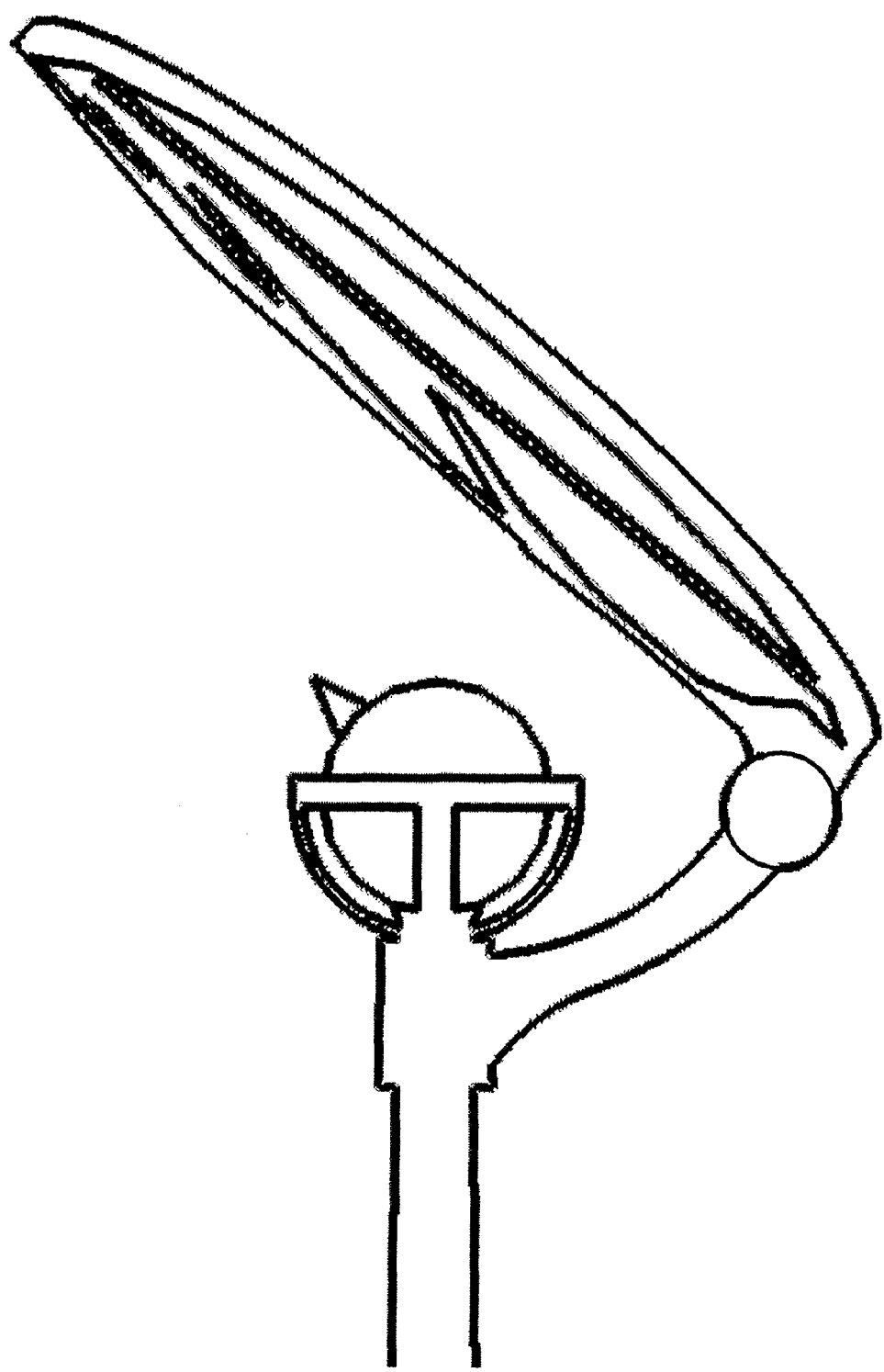
Figure 18:
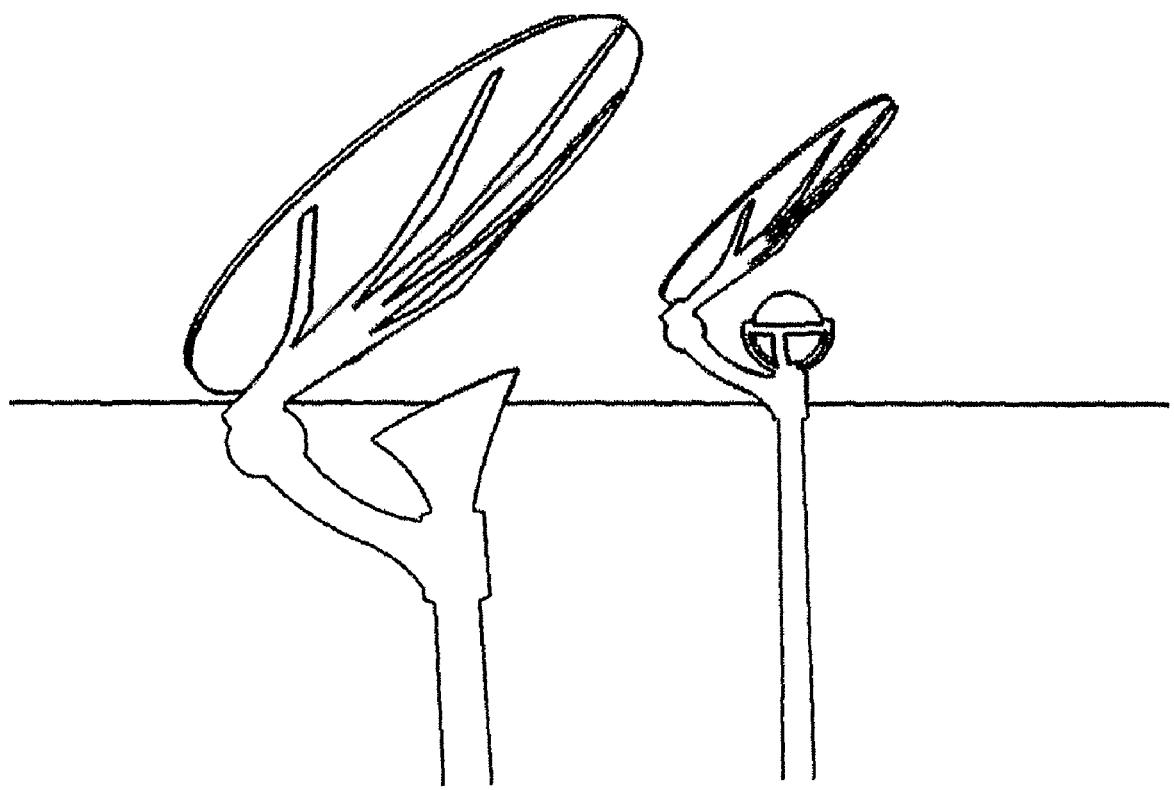
Figure 19:
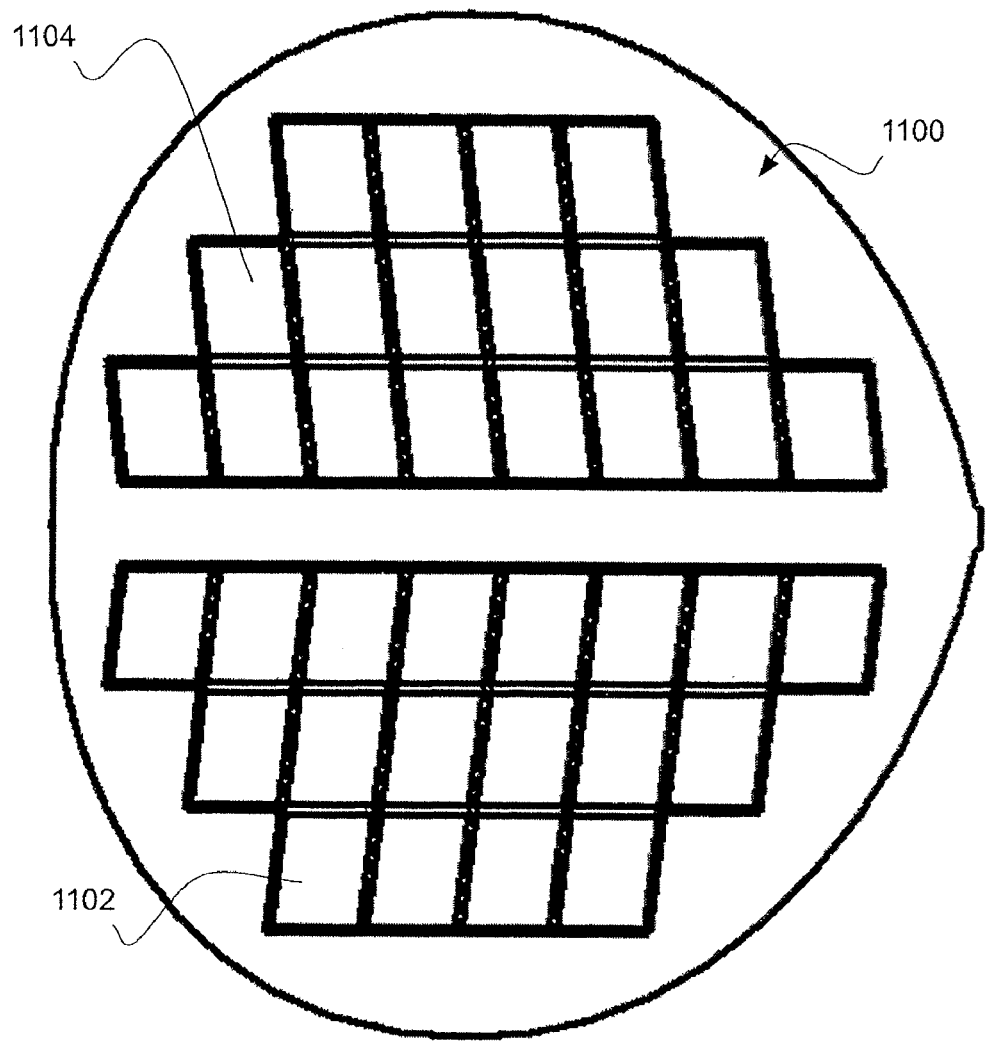

FIG. 16 depicts a front view of the FIG. 8 embodiment. FIG. 17 depicts a side view of the FIG. 9 embodiment. FIG. 18 depicts a perspective view of the FIG. 9 and FIG. 10 embodiments. FIG. 19 depicts a top plan view of split solar panel 1100.

Figure 20:
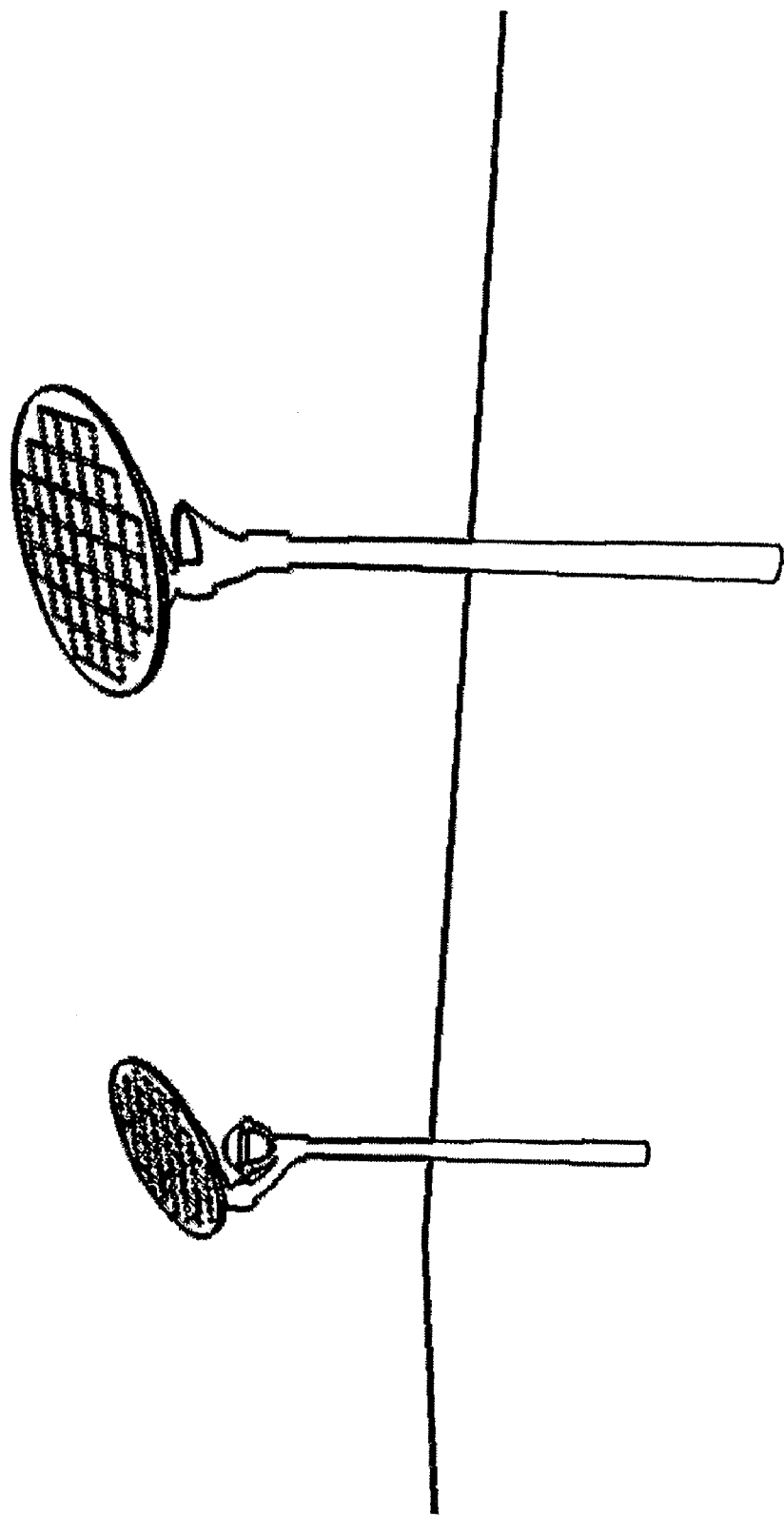
Figure 21:
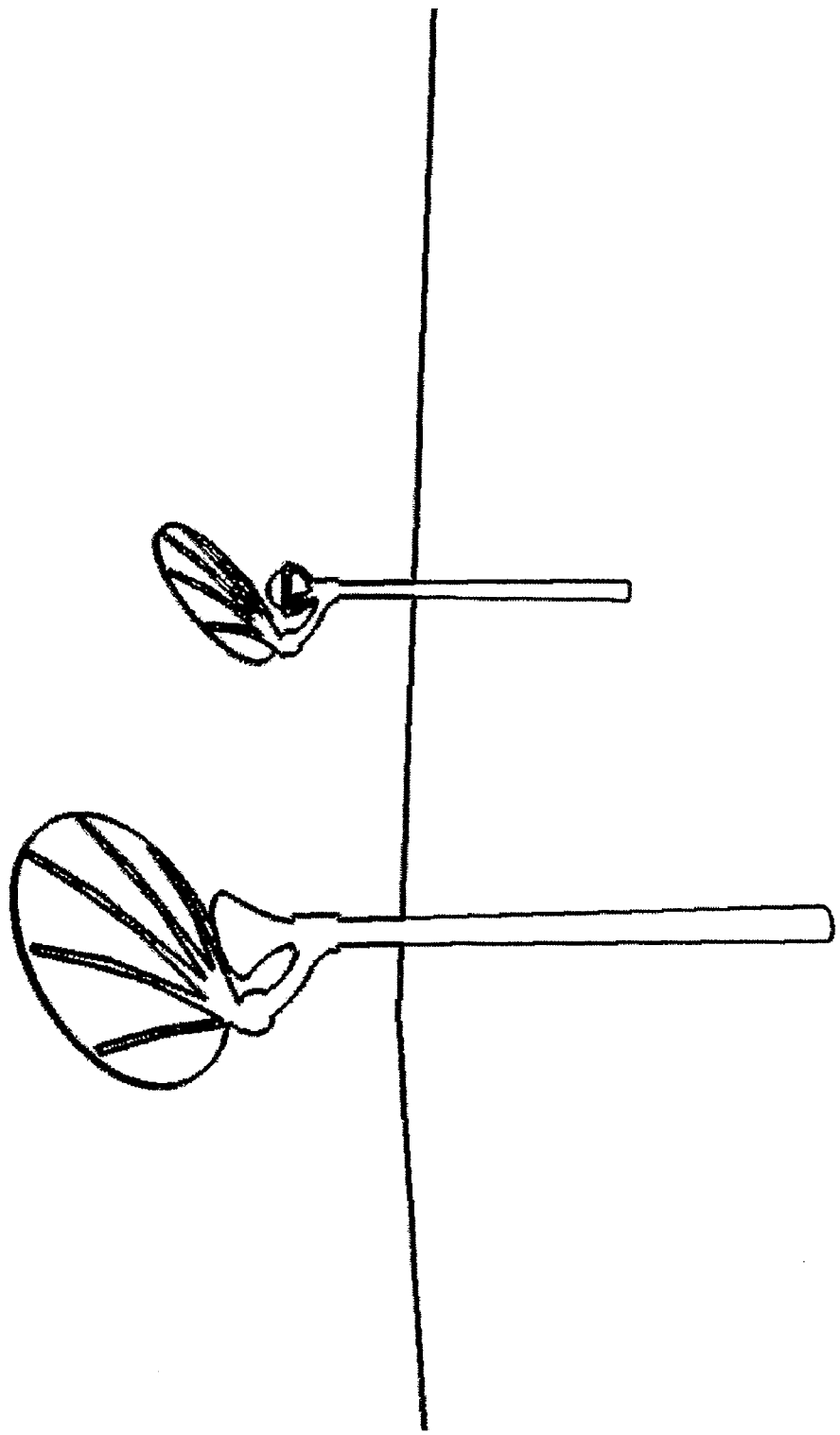

FIG. 20 depicts another perspective view of the FIGS. 9 and 10 embodiments. FIG. 21 depicts another perspective view of the FIG. 9 and FIG. 10 embodiments.

Figure 22:
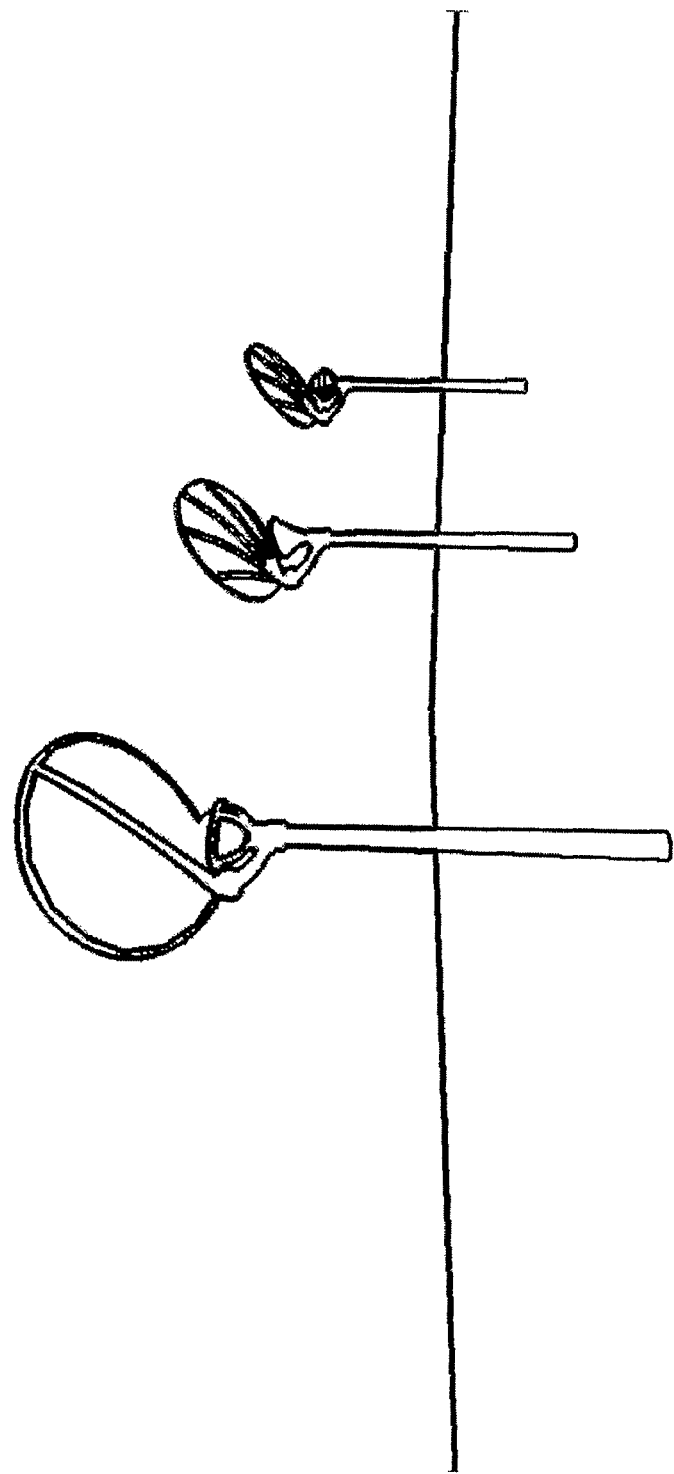
Figure 23:
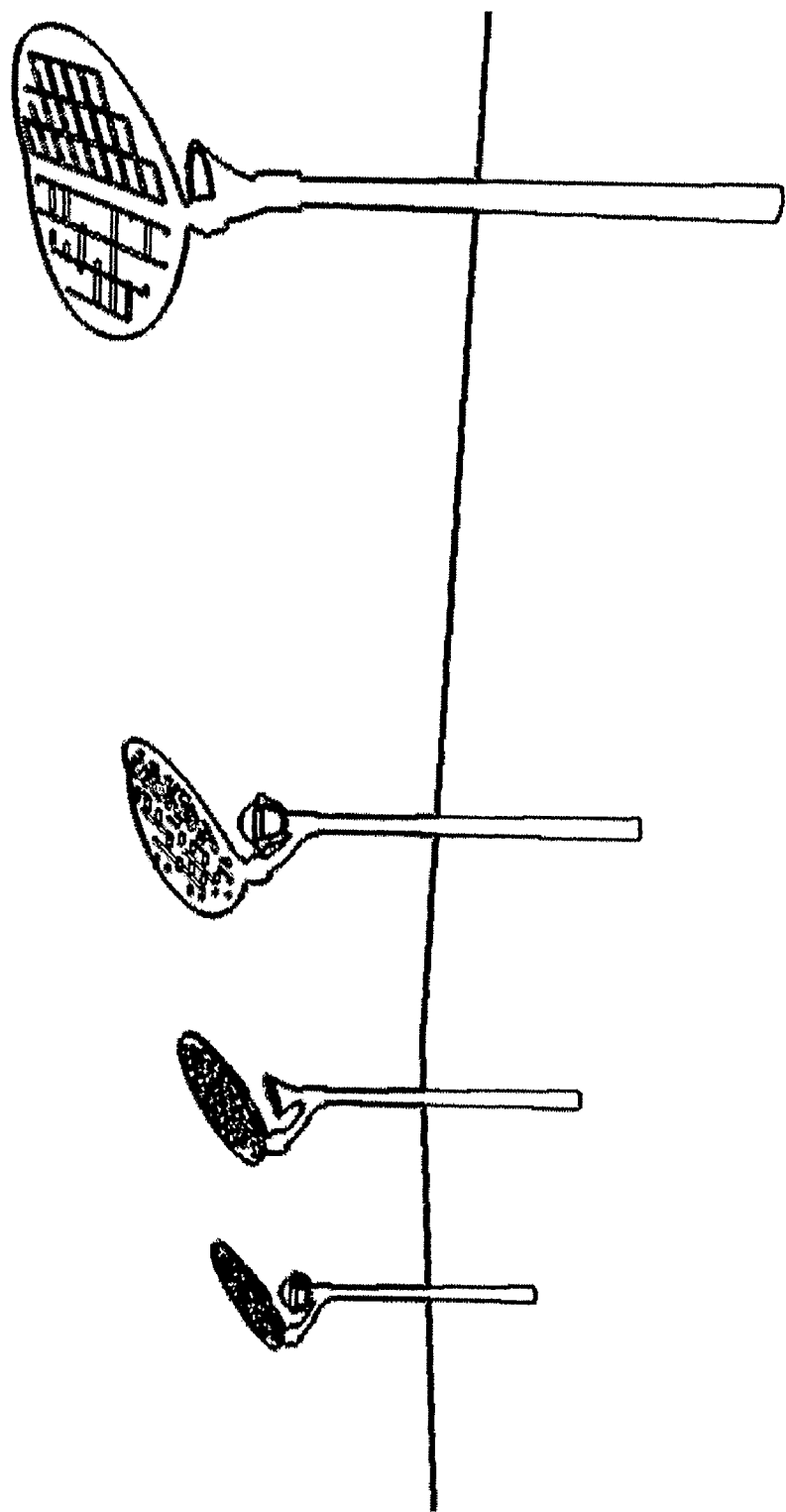

FIG. 22 depicts a perspective view of the FIG. 9, FIG. 10, and FIG. 11 embodiments. FIG. 23 depicts a perspective view of the FIG. 9, FIG. 10, FIG. 11, and FIG. 12 embodiments.

Figure 24:
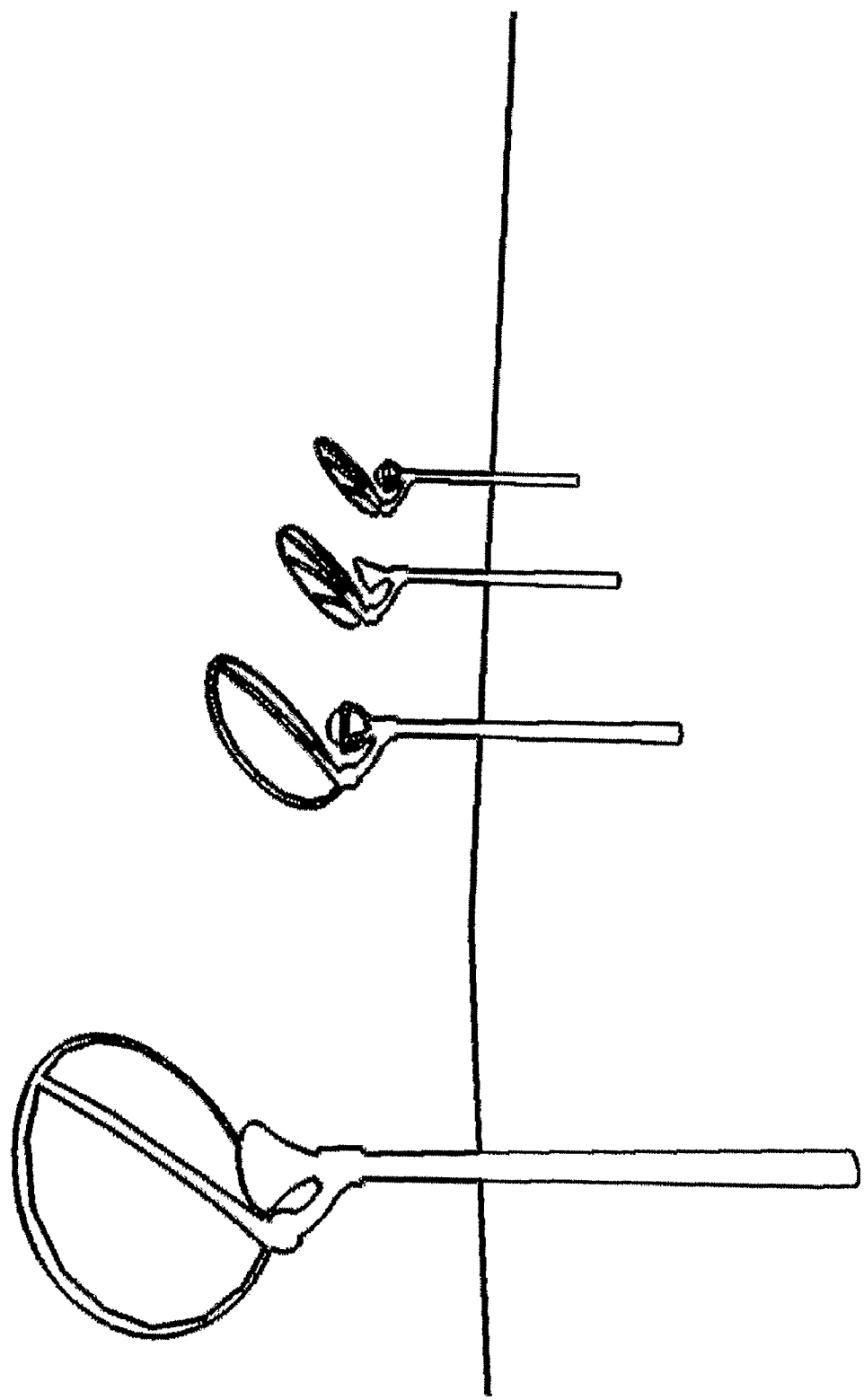
Figure 25:
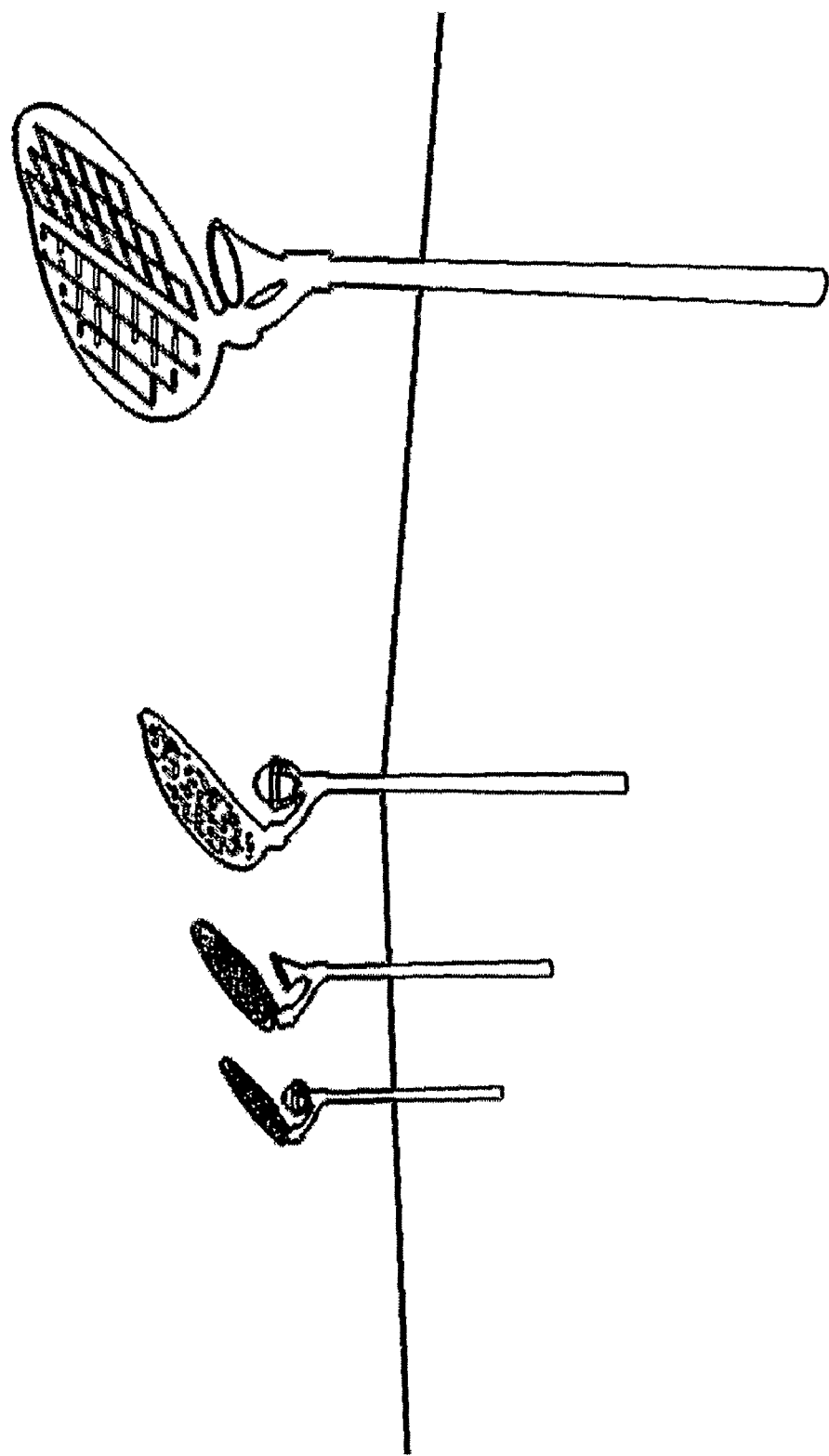

FIG. 24 depicts another perspective view of the FIG. 12, FIG. 11, FIG. 10, and FIG. 9 embodiments. FIG. 25 depicts another perspective view of the FIG. 9, FIG. 10, FIG. 11, and FIG. 12 embodiments.

Figure 26:
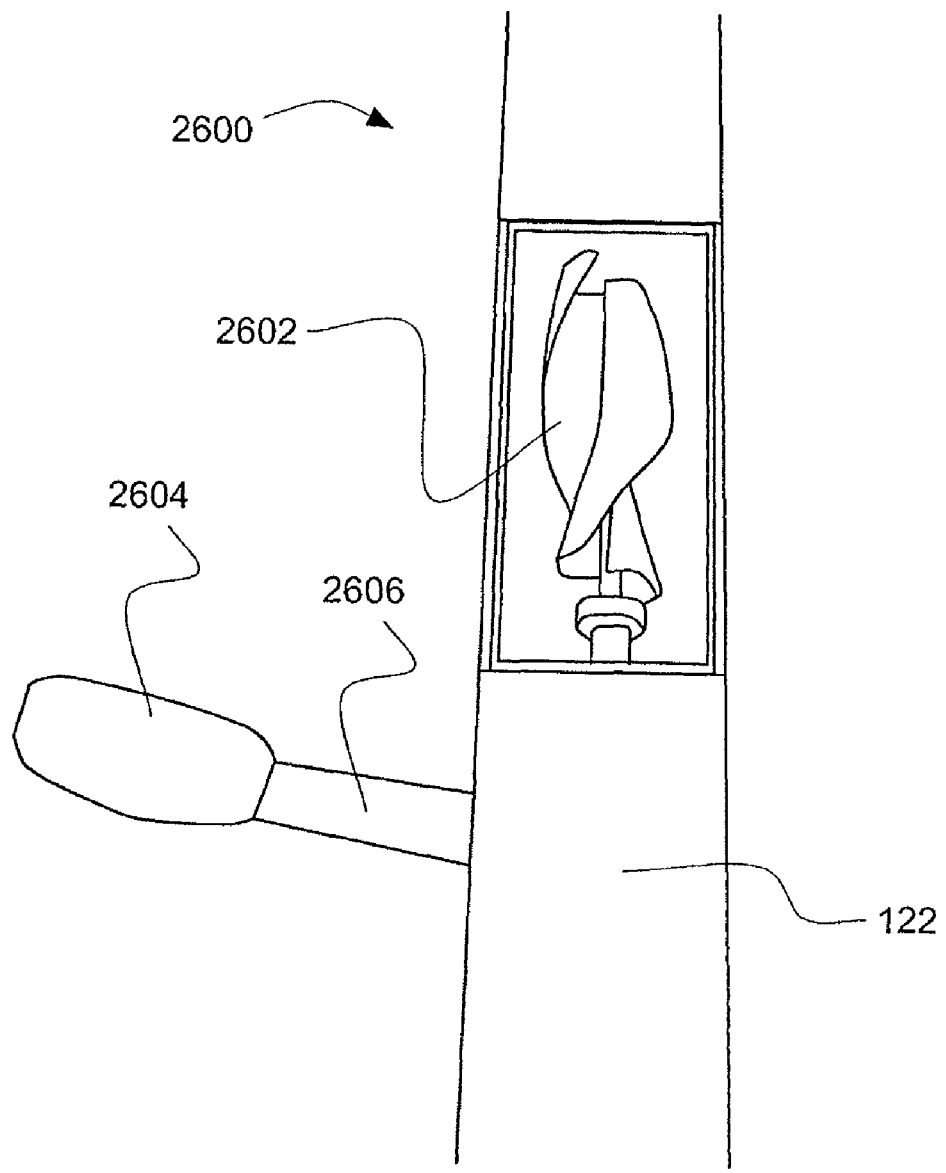
FIG. 26 is a side view of at least a portion of a hybrid lighting device according to an embodiment.

FIG. 26 depicts a side view of a hybrid lighting device 2600 according to an embodiment in which a vertically-oriented wind turbine 2602, similar to wind turbine 700 (FIG. 7), is positioned within support pole 122. A light source 2604, i.e., an induction-based light source, is connected with support pole 122 via a light source support arm 2606, such as light source connecting rod 114 (FIG. 1). In at least some embodiments, the wind turbine 2602 is positioned at least partially within the support pole 122.

Figure 27:
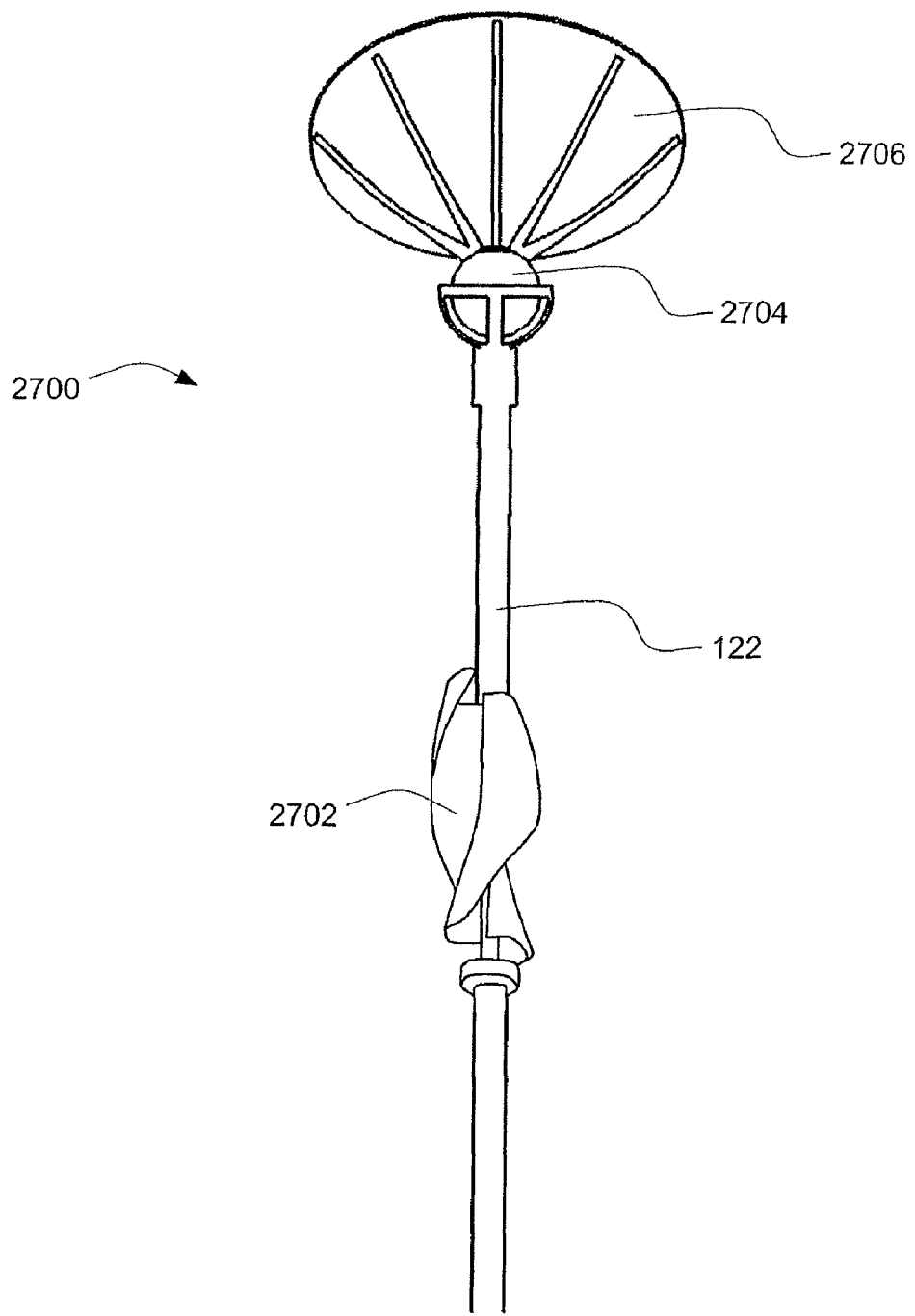
FIG. 27 is a side view of at least a portion of a hybrid lighting device according to another embodiment.

FIG. 27 depicts a rear view of a hybrid lighting device 2700 according to an embodiment in which a vertically-oriented wind turbine 2702, similar to wind turbine 700 (FIG. 7), is positioned inline with support pole 122. In accordance with this embodiment, support pole 122 forms an axis of rotation about which wind turbine 2702 rotates. In at least some embodiments, the axis of rotation of the wind turbine 2702 is coaxially aligned with the longitudinal axis of support pole 122. A light source 2704 is positioned atop support pole 122 in conjunction with a solar panel 2706 which is similar to solar panel 802 (FIG. 9).

What is claimed is:

1. A hybrid lighting device, comprising:
   at least one solar panel arranged to generate electric power;
   at least one wind turbine arranged to generate electric power;
   at least one energy storage device arranged to store electric power;
   a power controller electrically connected with the at least one energy storage device, optionally the at least one solar panel, optionally the at least one wind turbine, and arranged to transfer electric power;
   at least one induction-based light source electrically connected with the power controller, wherein the power controller is arranged to cause illumination of the induction-based light source for a predetermined period of time based on an energy storage power level threshold; and
   a vertically extending support structure being physically connected to the at least one solar panel and the at least one induction-based light source, the vertically extending support structure having a plurality of openings configured to permit passage of air,
   wherein the at least one wind turbine is positioned at the middle of the support structure, and is configured to receive air passing through the plurality of openings.

2. The device as claimed in claim 1, wherein the at least one wind turbine is directly electrically connected with the at least one energy storage device.

3. The device as claimed in claim 1, wherein the power controller is arranged to selectively transfer electric power from one or more of the at least one solar panel, the at least one wind turbine, and the at least one energy storage device to the at least one induction-based light source.

4. The device as claimed in claim 3, wherein the power controller is arranged to selectively transfer electric power responsive to a light sensor.

5. The device as claimed in claim 1, wherein the induction-based light source comprises a light sensor arranged to selectively activate the light source based on a detected light level.

6. The device as claimed in claim 1, wherein the at least one wind turbine is electrically connected in parallel with the at least one energy storage device.

7. The device as claimed in claim 1, wherein the at least one solar panel comprises a plurality of solar panels arranged circumferentially around the hybrid lighting device.

8. The device as claimed in claim 1, wherein the at least one induction-based light source comprises a plurality of induction-based light sources.

9. The device as claimed in claim 1, wherein the hybrid lighting device comprises solely induction-based light sources.

10. The device as claimed in claim 1, wherein the at least one wind turbine is positioned at least partially within the vertically extending support structure.

11. The device as claimed in claim 1, wherein the at least one wind turbine is positioned such that the axis of rotation of the wind turbine is coaxial with the vertically extending support structure.

12. The device as claimed in claim 1, wherein the at least one wind turbine is positioned below the light source.

13. The device as claimed in claim 1, further comprising an additional non-induction-based light source, wherein the power controller selectively enables activation of one or both of the at least one induction-based light source and the additional non-induction-based light source.

14. The device as claimed in claim 1, wherein the at least one wind turbine comprises a pair of twisted rectangular surfaces positioned about a central shaft extending vertically.

15. A hybrid lighting device, comprising:
   at least one solar panel arranged to generate electric power;
   at least one wind turbine arranged to generate electric power;
   at least one energy storage device arranged to store electric power;
   a power controller electrically connected with the at least one energy storage device, optionally the at least one solar panel, optionally the at least one wind turbine, and arranged to transfer electric power;
   at least one induction-based light source electrically connected with the power controller; and
   a vertically extending support structure being physically connected to the at least one solar panel and the at least one induction-based light source, the vertically extending support structure having a plurality of openings configured to permit passage of air,
   wherein the at least one wind turbine is positioned at least partially within the vertically extending support, and is configured to receive air passing through the plurality of openings.

16. The device as claimed in claim 15, wherein the at least one wind turbine is positioned such that the axis of rotation of the wind turbine is coaxial with the vertically extending support structure.

17. The device as claimed in claim 15, wherein the at least one wind turbine is positioned below the light source.

18. A hybrid lighting device, comprising:
- at least one solar panel arranged to generate electric power;
- at least one wind turbine arranged to generate electric power;
- at least one energy storage device arranged to store electric power;
- a power controller electrically connected with the at least one energy storage device, optionally the at least one solar panel, optionally the at least one wind turbine, and arranged to transfer electric power;
- at least one induction-based light source electrically connected with the power controller; and
- a vertically extending support structure being physically connected to the at least one solar panel and the at least one induction-based light source, the vertically extending support structure having a plurality of openings configured to permit passage of air,
- wherein the at least one wind turbine is positioned at least partially within the vertically extending support, and is configured to receive air passing through the plurality of openings, and the at least one wind turbine is positioned such that the axis of rotation of the wind turbine is coaxial with the vertically extending support structure,
- wherein the at least one wind turbine is positioned below the light source.

19. The device as claimed in claim 18, wherein the at least one wind turbine comprises a pair of twisted rectangular surfaces positioned about a central shaft extending vertically.

20. The device as claimed in claim 18, further comprising an additional non-induction-based light source, wherein the power controller selectively enables activation of one or both of the at least one induction-based light source and the additional non-induction-based light source.

* * * * *